United States Patent
Ogawa et al.

(10) Patent No.: US 9,626,635 B2
(45) Date of Patent: Apr. 18, 2017

(54) DISTRIBUTED AUTONOMOUS SYSTEM AND METHOD FOR CONTROLLING DISTRIBUTED AUTONOMOUS SYSTEM

(75) Inventors: Masatsugu Ogawa, Tokyo (JP); Atsuhiro Tanaka, Tokyo (JP); Yuma Matsuda, Tokyo (JP); Masafumi Yano, Miyagi (JP)

(73) Assignees: NEC CORPORATION, Minato-ku, Tokyo (JP); Masafumi Yano, Sendai-shi, Miyagi (JP)

( * ) Notice: Subject to any disclaimer, the term of this patent is extended or adjusted under 35 U.S.C. 154(b) by 701 days.

(21) Appl. No.: 14/118,718

(22) PCT Filed: May 1, 2012

(86) PCT No.: PCT/JP2012/061933
§ 371 (c)(1),
(2), (4) Date: Nov. 19, 2013

(87) PCT Pub. No.: WO2012/160978
PCT Pub. Date: Nov. 29, 2012

(65) Prior Publication Data
US 2014/0094935 A1    Apr. 3, 2014

(30) Foreign Application Priority Data
May 23, 2011 (JP) .................. 2011-114266

(51) Int. Cl.
*G06F 19/00* (2011.01)
*G06Q 10/06* (2012.01)
(Continued)

(52) U.S. Cl.
CPC ............. *G06Q 10/06* (2013.01); *G05B 13/02* (2013.01); *G06Q 10/04* (2013.01)

(58) Field of Classification Search
CPC ......... G05B 13/02; G06Q 10/06; G06Q 10/04
See application file for complete search history.

(56) References Cited

U.S. PATENT DOCUMENTS

| 6,405,179 B1 * | 6/2002 | Rebane | ............... G06Q 40/06 705/35 |
| 8,626,353 B2 * | 1/2014 | Ghosh | ............... G06Q 10/04 700/28 |

(Continued)

FOREIGN PATENT DOCUMENTS

| JP | 2002-165365 A | 6/2002 |
| JP | 2005-285016 A | 10/2005 |

OTHER PUBLICATIONS

Murata, Masayuki. "Future Information Network as Large-Scaled Complex Adaptive Systems." The 6th International Conference on Soft Computing and Intelligent Systems/The 13th International Symposium on Advanced Intelligent Systems. 2012.*

(Continued)

*Primary Examiner* — Michael D Masinick
(74) *Attorney, Agent, or Firm* — Sughrue Mion, PLLC

(57) ABSTRACT

An object is to provide a system in which components can overall operate in concert with one another by using only functions about the components, without using the theory of probability. The system includes a plurality of function blocks correlated to one another. The plurality of function blocks each include: a storing unit including an evaluation function that is associated with its own function block; a profit maximization control unit for adjusting the operation level of its own function block by information about the evaluation function of another of the plurality of function blocks that has a relation with its own function block; an activation/shutdown problem solution control unit for adjusting a suppression of the operation level by profit maximization control based on an active state/shutdown (Continued)

state of its own function block; and a restraint condition fulfillment control unit for adjusting the operation level of its own function block based on a restraint condition that is to be fulfilled by its own function block and all of the plurality of function blocks together.

19 Claims, 24 Drawing Sheets

(51) Int. Cl.
  *G06Q 10/04* (2012.01)
  *G05B 13/02* (2006.01)

(56) References Cited

U.S. PATENT DOCUMENTS

| | | | | |
|---|---|---|---|---|
| 2012/0185106 A1* | 7/2012 | Ghosh | ............... | G06Q 10/04 700/291 |
| 2014/0094935 A1* | 4/2014 | Ogawa | ............... | G06Q 10/04 700/12 |
| 2014/0249687 A1* | 9/2014 | Ogawa | ............... | G06Q 10/06 700/297 |

OTHER PUBLICATIONS

Shinohara, Masako, Takahiro Hara, and Shojiro Nishio. "Data replication considering power consumption in ad hoc networks." 2007 International Conference on Mobile Data Management. IEEE, 2007.*

International Search Report of PCT/JP2012/061933 dated Jul. 31, 2012.

* cited by examiner

DISTRIBUTED AUTONOMOUS SYSTEM AND METHOD FOR CONTROLLING DISTRIBUTED AUTONOMOUS SYSTEM

This is a National Stage of International Application No. PCT/JP2012/061933 filed May 1, 2012, claiming priority based on Japanese Patent Application No. 2011-114266 filed May 23, 2011, the contents of all of which are incorporated herein by reference in their entirety.

TECHNICAL FIELD

This invention relates to a system that comprises a plurality of function blocks and that can operate with the function blocks integrated in a manner adaptive to autonomous decentralization.

BACKGROUND ART

Currently, an increase in system scale and a phenomenon where what has not been systematized is suddenly turned into a large-scale system are in progress in various fields. A typical example of the former is found in the IT field such as data centers and networks that are related to a technology called cloud, and the scale thereof is increasing year after year. An example of the latter is found in the infrastructure field such as electric power, energy networks, and cities, which are all of a sudden becoming targets to be controlled as a smart grid, a smart city, or other large-scale system cases. How large-scale systems are to be controlled is therefore expected to be a very important issue in the near future.

Examples of control exerted in a system of the IT field include load balancing among computer resources, network load balancing, and decentralized storage arrangement. How load balancing among computer resources is controlled is described by taking as an example a load balancing method that is targeted for a data center (DC) including a plurality of servers.

The basic idea of conventional control eventuates in "balancing the internal state of the system", which is rather unsophisticated. With this mindset, while the control policy is clear in the case of a uniform system (where the plurality of servers are identical servers), what index is to be the basis of balancing is not clear in a mixed-machine system where different types of machines are used. For instance, while it is known that the CPU utilization ratios of the respective servers are to be balanced in the case of servers having the same performance, it is not obvious how to balance the CPU utilization ratios of servers that have different performance characteristics in a manner that reflects the servers' respective performance. A result obtained by the queuing theory, which is an index often used in conventional control, is an index based on the theory of probability, and tells nothing about what means to use in order to lead the system to a stochastically steady state. What this means is that, although requirements to be fulfilled such as response and throughput may be satisfied eventually, there are no guarantees or limitations with regard to processes in the middle and the situation of resources that are ultimately used. In other words, the resultant control is merely for fulfilling the required performance irrespective of whether the system is in a very inefficient state in terms of energy. Under such control, the inefficiency grows as the system increases in scale, and is expected to be a serious problem.

Control in the infrastructure field, typically, smart grid, is also attracting attention these days. This is because, with the arrival of energy-conscious society, situations are emerging where solar energy and other renewable energy sources are connected to conventional electric power grids, in addition to the desire for fine control to cut the waste of energy, and power supply from an electric power grid therefore becomes unstable instead unless the electric power grid is controlled as a total system including renewable energy. Efficient control of such new control targets, too, is therefore an important issue.

System control methods are roughly divided into two: one is centralized control and the other is autonomous decentralized control. Centralized management is easier for systems that are not so large, and many systems have been controlled in a centralized manner up to now. Centralized control is also suitable for cases where disturbance external to the system can be predicted and cases where what components constitute the system can be envisioned. In short, centralized control is very effective for predictable environments or scales that allow an overview. Centralized control is control in which an accurate overall picture of the system is grasped constantly, to thereby determine the situation and what action is to be taken. Simply put, centralized control is a method of setting down codes by if-then-else.

However, centralized systems are finding it difficult to handle large-scale systems due to the increase in system scale of these days, and autonomous decentralized systems are actively being studied. Autonomous decentralized control is control in which components such as resources operate using only relations among the components, and does not always need accurate overall information. As the system scale increases, knowing accurate overall information becomes more difficult and autonomous decentralized control is accordingly desired more. In electric power grids, typically smart grids, where predicting timing at which renewable energy is input to the system is difficult, centralized control may not be able to deal with a change in resource in real time. In IT systems, too, considering accidents such as a failure, autonomous control under which the system operates in real time so as to repair damage from an accident autonomously is naturally preferred to centralized control that is designed with such events in mind. Autonomous decentralized control is being studied actively because of these demands.

While a lot of people are studying self-proclaimed autonomous decentralized systems, it is also a fact that a very high percentage of the proposed ones are systems in which components merely exist in an autonomous decentralized manner and are overall not in concert with one another. These are not autonomous decentralized systems in its true sense. It is easy to create a system in which components exist in an autonomous decentralized manner, but there is no sense in designing a system in which components are overall not in concert with one another, or components do not operate for the goal of overall optimum. It is a system in which components operate for the goal of overall optimum in an autonomous decentralized manner that should be called an autonomous decentralized system. What constitutes such a true autonomous decentralized system?

Actually, such a system can be found close to home: the system of living organisms or brains is the true autonomous decentralized system. Autonomous decentralized systems taken after living organisms or brains are therefore actively being researched these days.

A very interesting study among them is a technology that uses "yuragi (which means "fluctuation" in Japanese) equation" ("Technological Innovation with Yuragi", Osaka University Yuragi Project, 2008). This is a technology of controlling components based on the yuragi equation, which is expressed by the following Expressions (1) and (2).

$$\frac{dx}{dt} = f(x) \cdot \text{Activity} + \eta \quad (1)$$

$$f(x) = -\frac{\partial U}{\partial x} \quad (2)$$

In the expressions, Activity is a type of bias and a function that takes a large value at a point x where the system in question feels comfortable. Symbols Ti and U respectively represent random noise and potential for driving the system.

The yuragi equation is similar to a Langevin equation expressed by the following Expression (3). These equations superficially resemble each other but there is a critical difference from the standpoint of engineering.

$$\frac{dx}{dt} = -\frac{\partial U}{\partial x} + \eta \quad (3)$$

The only difference between the yuragi equation and the Langevin equation is Activity. In a sense, the yuragi equation seems merely an expression in which potential is divided into U and Activity. This, however, creates the critical difference.

Hitherto, when the Langevin equation is used to control something, the potential U needs to be obtained accurately. A problem for obtaining potential with regard to a non-linear, intricate problem is very difficult, and there are few cases where the problem can be solved analytically. Machine learning and reinforcement learning which are popular nowadays are in actuality physically equal to obtaining the potential of a system, and use a neural network or the like to obtain the potential by a black-box approach. At present, there is no other way than the black-box approach to obtain potential for a non-linear, intricate problem with conventional technologies.

Anyway, obtaining potential is equal to setting a model, and aiming for more complex operation therefore complicates a potential function extremely, which gives rise to a problem in that an event cannot fully be expressed by a single potential function. A solution to this is the yuragi equation.

In the yuragi equation, comfortableness felt by the system is separated as Activity from the overall potential, thereby enabling a person to specify the operation of the system in a top-down manner. Specifically, Activity is set so that operation expected from the system is implemented. For instance, when one wishes to move a system to a point, a function that takes a maximum value at the desired point is given as Activity. In the case where the system is far from the desired point, the first term of the right-hand side of Expression (1) takes a small value, and components of the system are therefore driven by random noise of the second term of the right-hand side. This is a state similar to Brown motion if the components of the system are to be likened to particles. The system positioned far from the desired point in some cases accidentally comes close to the desired point through random movement such as Brown motion. The first term of the right-hand side of Expression (1) in this case takes a large value because of the action of the Activity function. Then what governs system operation shifts from the second term of the right-hand side to the first term of the right-hand side. Once the first term of the right-hand side starts controlling the system, the system now naturally settles at a potential point where Activity is maximum. In short, the desired point is reached.

What is important here is that, when the yuragi equation is used, only Activity is determined in a top-down manner without issuing a special command to the components of the system or exerting special control on the components of the system. An output to be given to each component of the system is an output that is in proportion to the value of the right-hand side of Expression (1). Cases where there are a plurality of components can similarly be dealt with by giving outputs that are in proportion to the right-hand side of Expression (1). In this case, random noise in one driving unit is independent of random noise in another driving unit. Activity, on the other hand, is the same for all components. This way, despite the respective components simply operating in accordance with their individual versions of Expression (1), the action of Activity which integrates the overall system causes the components to eventually operate in concert with one another on the whole and move to a point where Activity is maximum.

A system comprising a plurality of components, too, can thus operate in an autonomous-decentralized, concerted manner by using the yuragi equation. As disclosed in Patent Literature 1, for example, autonomous decentralized control of network paths using this technology is being studied and results indicating effectiveness such as autonomous avoidance of failure have been obtained (Patent Literature 1).

CITATION LIST

Patent Literature

Patent Literature 1: Japanese Unexamined Patent Application Publication (JP-A) No. 2005-285016

DISCLOSURE OF THE INVENTION

Problems to be Solved by the Invention

As described above, the "yuragi equation" which is a prospective technology is being studied, and has been found to have room for improvement in two points. One is that control by the yuragi equation is stochastic control. Specifically, because random noise is used in Expression (1) as the source of power for each component, the component does not always operate deterministically. This means that the component's operation varies depending on the probability at the time, which can lead to redundant control. Components of a true autonomous decentralized system should operate deterministically for the goal of overall optimum.

The other point concerns setting Activity. As described above, the Activity function can be set by a person in a top-down manner. In actuality, however, there are many cases where a person cannot imagine a function of the overall maximum itself. Only functions about the components can be set or checked by a person, and it is actually very often the case that a function indicating a state where the components are in concert with one another cannot be imagined.

This invention has been made in view of the problems described above, and an object of this invention is therefore to provide a system in which components can overall operate in concert with one another by using only functions about the components, without using the theory of probability.

Means to Solve the Problems

In order to accomplish the above-mentioned object, according to a first aspect of this invention, there is provided a system, including a plurality of function blocks correlated to one another, in which the plurality of function blocks each include: a storing unit including an evaluation function that is associated with the each of the plurality of function blocks; a restraint condition fulfillment control unit for controlling an operation level of the each of the plurality of function blocks based on a restraint condition that is to be fulfilled by the each of the plurality of function blocks and all of the plurality of function blocks together; a profit maximization control unit for controlling the operation level of the each of the plurality of function blocks by information about the evaluation function of another of the plurality of function blocks that has a relation with the each of the plurality of function blocks; and an activation/shutdown problem solution control unit for controlling an active state/shutdown state of the each of the plurality of function blocks depending on the operation level of the each of the plurality of function blocks, by using results of the control of the restraint condition fulfillment control unit and the control of the profit maximization control unit.

According to a second aspect of this invention, there is provided a system control method for use in the system as described in the first aspect.

Effect of the Invention

According to this invention, it is possible to provide the system in which the components can overall operate in concert with one another by using only the functions about the components, without using the theory of probability.

MODE FOR EMBODYING THE INVENTION

A preferred embodiment mode of this invention is described in detail below with reference to the drawings.

Figure 1:
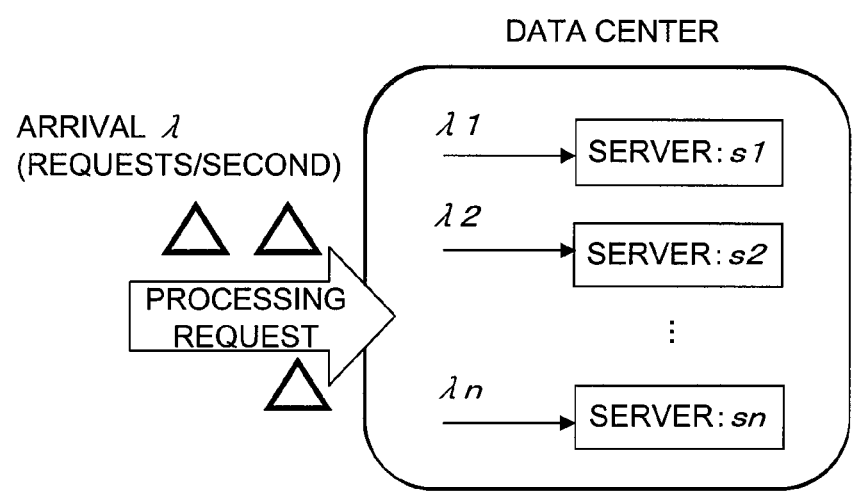
FIG. 1 is a schematic system diagram studied in the invention of this application.

The operation and configuration of this invention are described first taking as an example load balancing among resources of a data center. Discussed here as an example in which a problem cannot be solved satisfactorily with conventional technologies is load balancing in a mixed-machine data center where servers of different performance characteristics are used. In a data center where a plurality of (N) servers of different performance characteristics are coupled by a network, processing requests are distributed among the servers as seen fit while requested response values are satisfied. At the same time, the overall power consumption of the data center is reduced as much as possible. Such a problem is examined in the following. A schematic diagram of this problem is illustrated in FIG. 1.

As a result of studying the problem, the inventors of this invention have reached the following conclusion.

The problem to be solved has a structure in which two problems are intermingled. One is an activation/shutdown problem and the other is an optimization problem.

Figure 2:
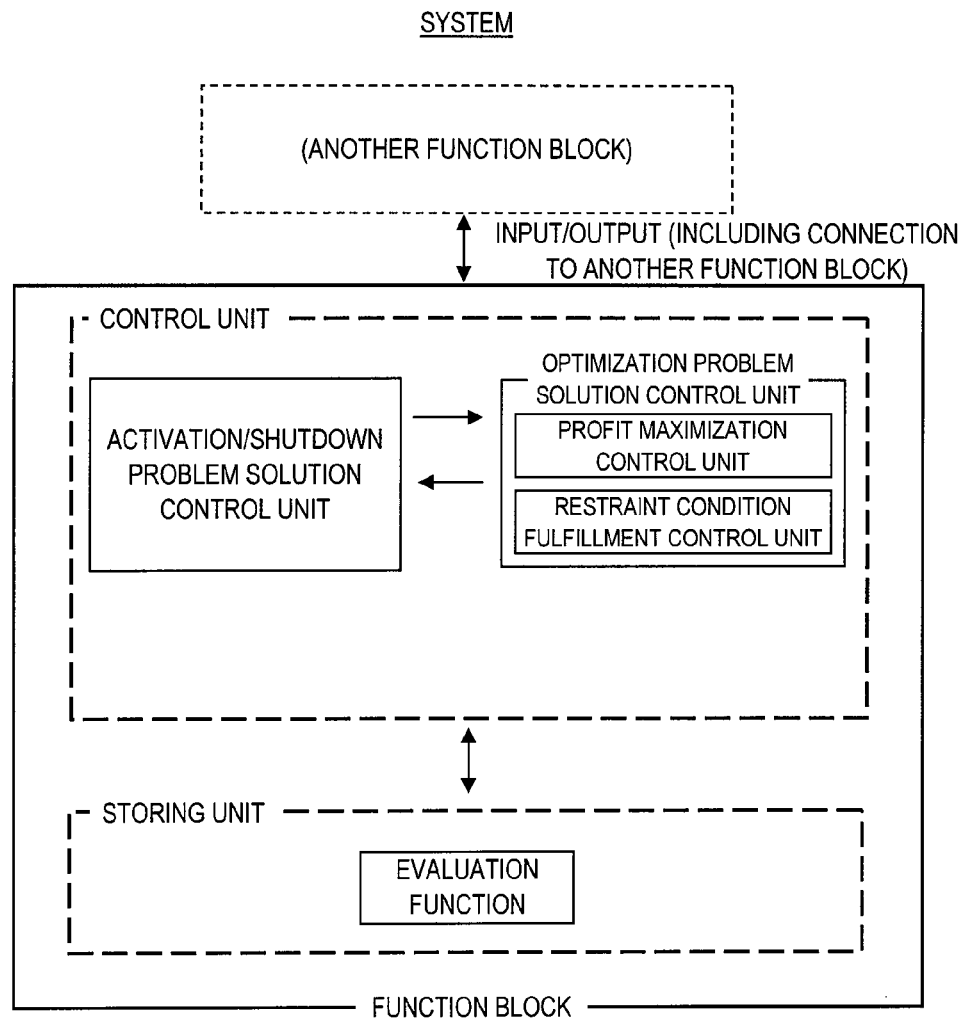
FIG. 2 is a schematic architecture diagram according to the invention of this application.

The activation/shutdown problem is a problem of determining or managing which resource is to be used and which resource is not to be used when there is a group of resources (a group of function blocks). The optimization problem is a problem of how a task assigned to the overall system is to be distributed in order to accomplish optimization based on an index when resources are allocated. Hitherto, these problems have often been attempted to be solved separately by stochastic approaches. With the simple theory of probability, however, it is difficult to quickly deal with a situation in real time in a robust manner in an environment that keeps changing freely. The inventors of this invention have devised architecture with which a situation can be quickly dealt with in real time in a robust manner depending on the circumstances by regarding the two problems as a unitary problem. The inventors of this invention have also devised a method of solving the respective problems by a deterministic approach or a relational approach, instead of a stochastic approach. FIG. 2 illustrates a schematic diagram of the architecture of a function block devised by the inventors of this invention and a system that bundles the function block with others.

As illustrated in FIG. 2, the function block of this application mainly includes an activation/shutdown problem solution control unit and an optimization problem solution control unit, and constitutes the system together with a correlated function block (another function block).

A detailed description is given next on solving means of the respective parts.

A solution to the optimization problem is described first.

Two requirements need to be considered in order to solve the optimization problem. One is demand-supply balancing and the other is the maximization of the overall profit. It cannot be said that optimization is accomplished unless the two are both satisfied. Demand-supply balancing control is also control for fulfilling a restraint condition, and may therefore be called restraint condition fulfilling control.

In short, the optimization problem solution control unit in the architecture of FIG. 2 comprises a profit maximization control unit and a restraint condition fulfillment control unit.

Demand-supply balancing is in many cases a restraint condition in that the total amount of a mission or task required of the overall system needs to be satisfied. Unless this is fulfilled, there is no sense in maximizing efficiency or profit. The demand in this example is the sum of values of an operation level $\lambda_i$ (i represents a function block number), and is expressed by the following Expression (4).

$$Dem = \sum_i \lambda_i \quad (4)$$

To accomplish demand-supply balancing, the restraint condition fulfillment control unit determines the operation level of each function block (resource) with the use of an equation that satisfies the following Relation (5).

$$\frac{d\lambda_i}{dt} \propto Dem - \sum_k \lambda_k \quad (5)$$

In (5), represents the operation level of another function block that has a relation with a function block of the operation level $\lambda_i$.

This equation is more specifically expressed by the following Expression (6).

$$\frac{d\lambda_i}{dt} = K_1 \cdot \lambda_{nom,i} \frac{Dem - \sum_k \lambda_k}{Dem} \quad (6)$$

In this expression, the symbol $K_1$ is a coefficient equivalent to a gain of a change in operation level. The symbol $\lambda_{nom,i}$ represents a normalization coefficient of the function block i (an amount equivalent to the scale of the function block), and is not always necessary. However, multiplying by a normalization coefficient overall is often preferred in the case of heterogeneous components, which is why $\lambda_{nom,i}$ is introduced in Expression (6). The restraint condition fulfillment control unit controls the operation levels of the function blocks in a manner determined by Expression (6), thereby causing the overall system to operate so as to fulfill Dem, which is the restraint condition.

Next to be solved is overall profit maximization, which may be reworded as overall efficiency maximization. To solve overall profit maximization, such evaluation functions as those of FIG. 3 which are related to the respective components (function blocks) are introduced (in FIG. 2, the evaluation functions are stored in a storing unit of the function block). In this example, the axis of abscissa represents a parameter for controlling each function block, which corresponds to a processing request amount X or the like. The axis of ordinate represents an index related to some form of efficiency, and concrete examples of the index are described in detail in embodiments discussed later.

Figure 3:
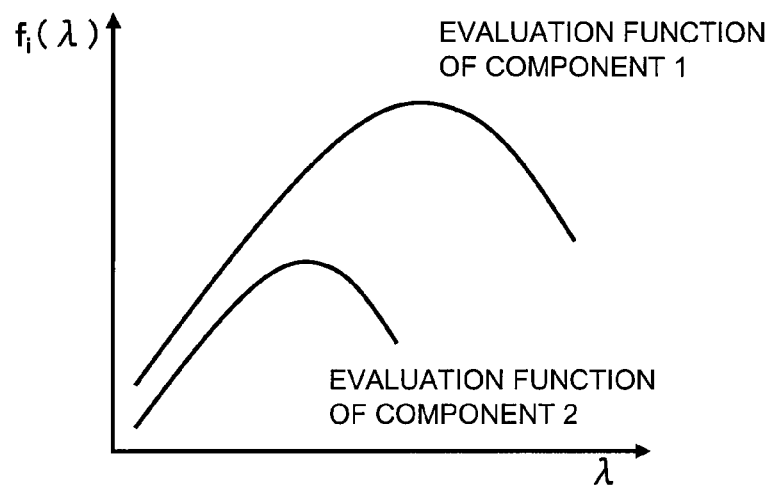
FIG. 3 is a schematic graph of evaluation functions that are used in the invention of this application.

As is obvious from FIG. 3, the evaluation functions are convex functions. The use of convex functions is another point of the invention of this application. This is because some form of efficiency, system stability, and the like can be expressed by such convex functions as those illustrated in FIG. 3 in many systems. While it is a common practice to call functions that are convexed upward as those in FIG. 3 as concave functions and to call functions that are convexed downward as convex functions, the expression that distinguishes functions by the functions' properties is employed herein, and concave functions, too, are expressed as convex functions.

A problem for accomplishing overall optimization (a state where the sum of values of evaluation functions of the respective components is maximum) through cooperation between components whose evaluation functions are convex functions is known as "convex programming problem". It has mathematically been proven that, in a convex programming problem, optimization is accomplished under a situation where differential values of evaluation functions at the operation levels of the respective components are equal to one another. This principle is applied here, which is the reason why convex functions are used here as evaluation functions.

Considering this principle, an equation for accomplishing overall profit maximization satisfies the following Relation (7).

$$\frac{d\lambda_i}{dt} \propto \left( \frac{df_i}{d\lambda_i} - \frac{df_k}{d\lambda_k} \right) \quad (7)$$

In Expression (7), $f_i$ is an evaluation function of the function block i (the i-th function block), and $f_k$ is an evaluation function of another function block k that has a relation with the function block i.

The equation is more specifically expressed by the following Expression (8).

$$\frac{d\lambda_i}{dt} = K_2 \cdot \lambda_{nom,i} \frac{\sum_k \lambda_{nom,k} \left( \frac{df_i}{d\lambda_i} - \frac{df_k}{d\lambda_k} \right)}{\sum_k \lambda_{nom,k}} \quad (8)$$

In this expression, the symbol $K_2$ is a coefficient equivalent to a gain of a change in operation level. The profit maximization control unit controls the respective function blocks so that Expression (8) is satisfied, thereby causing the function blocks to operate in a manner that equalizes differential values of evaluation functions at the operation levels.

To solve the optimization problem ultimately, the demand-supply balancing and overall profit maximization described above need to be solved simultaneously. The optimization problem solution control unit therefore controls the operation levels of the respective function blocks by the following Expression (9), which is created by integrating Expression (6) and Expression (8).

$$\frac{d\lambda_i}{dt} = K_1 \cdot \lambda_{nom,i} \frac{Dem - \sum_k \lambda_k}{Dem} + K_2 \cdot \lambda_{nom,i} \frac{\sum_k \lambda_{nom,k} \left( \frac{df_i}{d\lambda_i} - \frac{df_k}{d\lambda_k} \right)}{\sum_k \lambda_{nom,k}} \quad (9)$$

A solution to the activation/shutdown problem is described next.

Expression (9) actually contains a function of activation/shutdown a component. The second term of the right-hand side has an effect in that one component and another component suppress each other via gradients of evaluation functions. The phenomenon that actually occurs is that a component whose evaluation function is greater in gradient (greater in efficiency improvement) suppresses, or even stops in some cases, a component whose evaluation functions is smaller in gradient (smaller in efficiency improvement). It can therefore be said that the second term of the right-hand side of Expression (9) contains a function of solving a shutdown problem out of the activation/shutdown problem. On the other hand, the first term of the right-hand side is capable of activating a component that has shut down or that has been shut down. When the demand falls short, the first term of the right-hand side takes a positive value and moves each component toward a direction in which the component operates more. This means that as a result, even a component that has shut down is moved toward a direction in which the component is activated. The first term of the right-hand side of Expression (9) therefore contains a function of solving an activation problem out of the activation/shutdown problem.

Figure 4A:
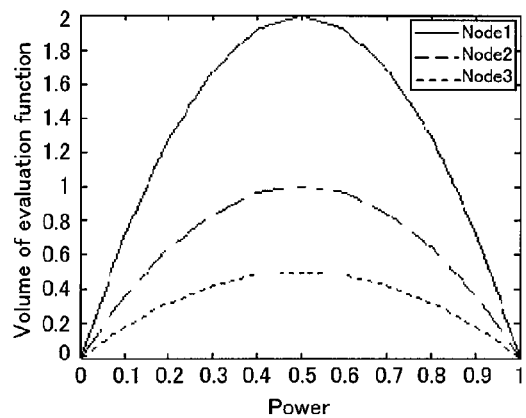
FIG. 4A is a graph of a control image according to the invention of this application that is for a case where an activation/shutdown problem solution control unit is not put into operation.
Figure 4B:
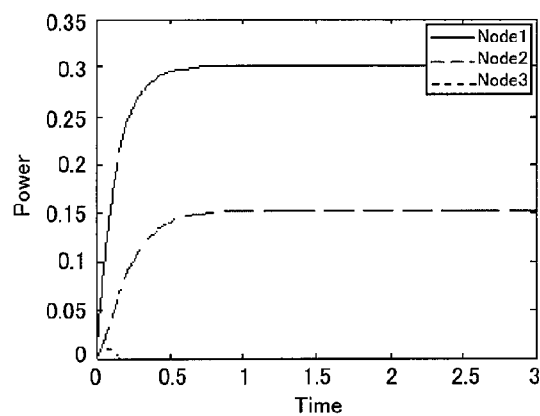
FIG. 4B is a graph of a control image according to the invention of this application that is for the case where the activation/shutdown problem solution control unit is not put into operation.
Figure 4C:
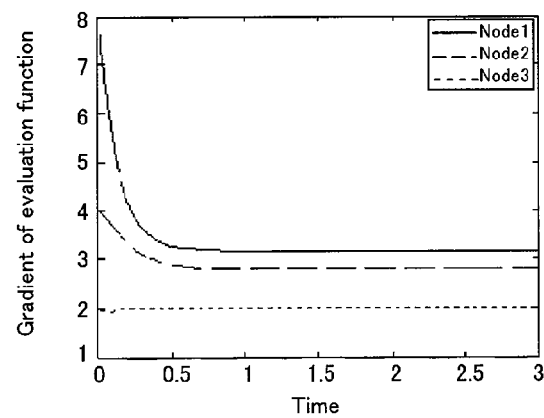
FIG. 4C is a graph of a control image according to the invention of this application that is for the case where the activation/shutdown problem solution control unit is not put into operation.

However, simply applying Expression (9) does not constitute solving the optimization problem after the activation/shutdown problem is solved, because Expression (9) as it is just contains the function of activating and the function of shutting down. FIGS. 4A to 4C show an example of how function blocks operate in the case where the activation/shutdown problem solution control unit simply solves Expression (9). In this example, the activation/shutdown problem solution control unit uses Expression (9) to control how much load (power) each component needs to bear in order to accomplish a load of 0.4 in total when three function blocks (here, corresponding to servers) coupled in series comprise evaluation functions shown in FIG. 4A. A limiter is applied so that a load equal to or smaller than 0 is treated as 0. FIG. 4B shows changes with time of the load of the respective components, and FIG. 4C shows changes with time of the differential values of the evaluation functions of the respective components. It can be seen in FIG. 4B that a "node 3" (a function block 3) which is poor in efficiency has automatically shut down. Though it superficially seems that the activation/shutdown problem is solved by Expression (9), it is understood from FIG. 4C that differential values of a "node 1" and a "node 2" do not match. While there is no need for differential values of the "node 1" and the "node 2" to match the differential value of the "node 3" which has shut down, a mismatch between differential values of the active "node 1" and "node 2" means that the system has not reached an optimized state. In other words, the activation/shutdown has been accomplished but not the optimization. This is because simply applying Expression (9) causes a function block that has shut down to suppress a function block that is active.

In addition, a rapid increase in demand, for example, may not lead to the activation of the "node 3" which has shut down in FIG. 4 even when the activation function of the first term of the right-hand side of Expression (9) is in effect, depending on suppression by the second term of the right-hand side of Expression (9). For instance, the "node 3" remains shut down when an increment of the first term of Expression (9) is less than the suppression by the second term.

Thus, solving the activation/shutdown problem and the optimization problem both cannot be achieved by simply solving Expression (9) by the activation/shutdown problem solution control unit.

This invention addresses this by giving a function of managing the activation/shutdown state of function blocks and adjusting control of Expression (9) to the optimization problem solution control unit controlled by Expression (9).

Specifically, the activation/shutdown problem solution control unit is given the following functions.

The first function is for excluding a function block that has shut down (a function block that has reached the minimum value of its share of the load) or a function block that has reached an upper limit to the load in the calculation of the second term of the right-hand side of Expression (9). The second function is for excluding the second term of the right-hand side of Expression (9) and using only the first term of the right-hand side when calculating the load of a function block that has shut down or a function block that has reached an upper limit to the load (namely, a function of circumventing the use of the profit maximization control unit). The point is that the first term of the right-hand side of Expression (9) and the second term of the right-hand side of Expression (9) are handled independently of each other, depending on the state of function blocks. This is where the significance of existence of the activation/shutdown problem solution control unit resides. The system can thus solve the activation/shutdown problem (including a function block that has reached an upper limit and is therefore substantially the same as a function block that has shut down) while separating a function block that has shut down and therefore substantially cannot be changed in operation level, or a function block that has reached an upper limit to the load, from the control of the profit maximization control unit, and can use, if necessary, the restraint condition fulfillment control unit to bring the function block that has substantially shut down into an operating state (active state).

More concrete descriptions are given on the two functions described above.

Excluding a function block that has shut down or a function block that has reached an upper limit to the load in the calculation of the second term of the right-hand side of Expression (9) means that, when calculating the load of a function block that is active, for example, 0 is set to the numerator of the second term of the right-hand side of Expression (9) for a function block that has shut down or a function block that has reached an upper limit to the load. Because the numerator of the second term of the right-hand side is of course not 0 for function blocks that are active, there is a chance that the second term of the right-hand side has some value in the case where a function block that is active is connected to a function block for which the load is to be calculated. When calculating the load of a function that has shut down or a function block that has reached an upper limit, on the other hand, the second term of the right-hand side is ignored, in other words, the second term of the right-hand side is treated as 0. This way, only the first term of the right-hand side of Expression (9) affects a function block that has shut down or a function block that has reached an upper limit, and these function blocks can be activated again when there is a problem in demand and supply.

Figure 5A:
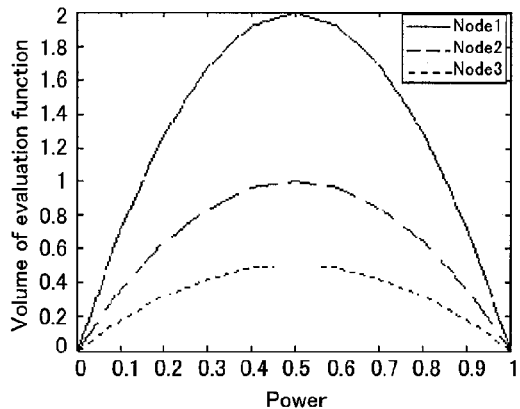
FIG. 5A is a graph of a control image according to the invention of this application that is for a case where the activation/shutdown problem solution control unit is put into operation.
Figure 5B:
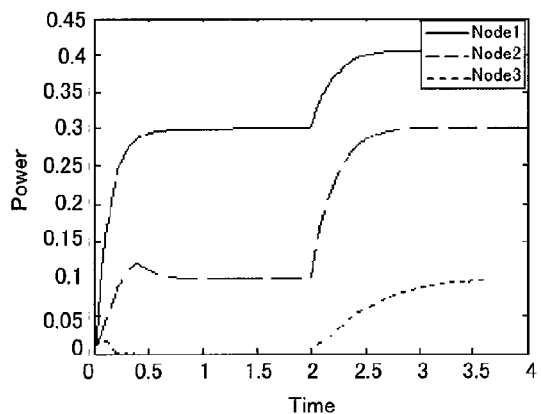
FIG. 5B is a graph of a control image according to the invention of this application that is for the case where the activation/shutdown problem solution control unit is put into operation.
Figure 5C:
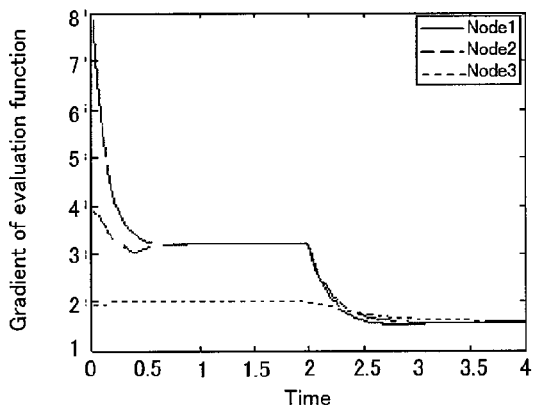
FIG. 5C is a graph of a control image according to the invention of this application that is for the case where the activation/shutdown problem solution control unit is put into operation.

Control for solving the activation/shutdown problem and the optimization problem unitarily is thus completed by the activation/shutdown problem solution control unit and optimization problem solution control unit proposed in the invention of this application. FIGS. 5A to 5C show an example of controlling load balancing among three "nodes" (function blocks) when the demand changes from 0.4 to 0.8 (at a time 2). In FIGS. 5A to 5C, which use the same notation as in FIGS. 4A to 4C, control for shutting down the "node 3" when the demand is 0.4 and activating the "node 3" anew when the demand changes to 0.8 is implemented. The gradients of evaluation functions ultimately converge into the same values at any one of the two values of the demand, which proves that the optimization problem, too, has been solved.

Although demand-supply balancing is often a restraint condition in that the total amount of a mission or task required of the overall system needs to be satisfied as stated in the description given above on demand-supply balancing, there are other cases. Control in that case involves transforming the demand-supply balancing terms described above so that the restraint condition is fulfilled. In this case, too, it is vital to manage the situations of function blocks with the activation/shutdown problem solution control unit. Otherwise, activation and shutdown are not implemented properly.

The important point here is that, while evaluation functions of the respective function blocks are set, an evaluation function for the function blocks as a whole is not set. Not needing to set an overall evaluation function is a huge advantage because, as opposed to evaluation functions of individual function blocks which can be set in various ways, how to set an overall evaluation function becomes increasingly unclear as the system grows more complicated. In addition, the system here may allow each component to operate based only on information about its own state and the state of a component related to itself. Although information used in demand-supply balancing may be regarded as overall information, in an electric power system or other cases where a poor demand-supply balance can be detected from fluctuations in alternating frequency, demand-supply balancing, too, can be implemented in a completely autonomous decentralized manner. In short, a system can be a true autonomous decentralized system which does not need overall information if the system is capable of obtaining information relevant to demand-supply balancing from itself.

This system basically operates independently in an autonomous decentralized manner and, when there is a failure in a component, other components autonomously execute a recovery operation so as to cover the loss of signals from the failed component. The system can also autonomously and gradually be adjusted toward a proper operation after a sudden addition or removal of a component. In other words, the system is very robust with respect to external disturbance, and has a scalability with which components can be added or removed freely.

Conventional systems are powerless to failures and need to prepare various sequences for errors. Conventional systems also have no guarantees that the overall system stability is maintained against an unplanned addition or removal of components (resources), and require reviewing programs and processing each time. The system of this application can solve all of those problems by control adaptive to autonomous decentralization.

EMBODIMENTS

More detailed descriptions are given below on embodiments of this invention with reference to the drawings.

First Embodiment

The invention of this application is carried out for the load balancing among resources of a data center that is illustrated in FIG. 1. The operation level (n represents a function block number) of a resource in this case corresponds to a task amount allocated to the resource.

When load balancing among resources of a data center is considered, restraint conditions that matter to an administrator are response, throughput, energy, and the like. An embodiment of the invention of this application in which response and throughput are restraint conditions is described first.

Response and throughput, which have a strong relation to each other, are respectively defined as follows. A response R is the very time required for processing, and a throughput S is a workload processed per unit time. Therefore, simply, the following Expression (10) is established in relation to a requested workload k.

$$S = \lambda \cdot R \quad (10)$$

$(S \leq 1)$

However, an effective response Re of an actual resource is not like this, and requires considering a stochastic queuing time by the queuing theory. This is because the effective response depends not only on the processing performance of the resource of its own but also on how much work arrives and how much work is unprocessed and has built up, which are clarified by the queuing theory through stochastic calculation.

According to the queuing theory, a time Tm from the arrival of work to the completion of the processing of the work is expressed by the following Expression (11).

$$Tm = 1/(\mu - \lambda) \quad (11)$$

In this expression, the symbol $\mu$ represents a processing rate per unit time, and is the reciprocal of the response R. With the effective response Re, which can be regarded as the reciprocal of Tm, and the relation of (10), the following Expression (12) is established.

$$\begin{aligned} Re &= \mu - \lambda \quad (12) \\ &= 1/R - S/R \\ &= (1 - S)/R \end{aligned}$$

The effective response Re, too, thus has a close relation with the throughput. What is understood from Expression (12) is that the effective response can be improved by reducing the throughput, whereas the throughput can be improved by deteriorating the effective response. In short, the effective response and the throughput are in a trade-off relation with each other in which one of the two is in an invalid state (becomes 0) at the limit value of the other, and the administrator needs to balance the two at an appropriate balance.

Figure 6:
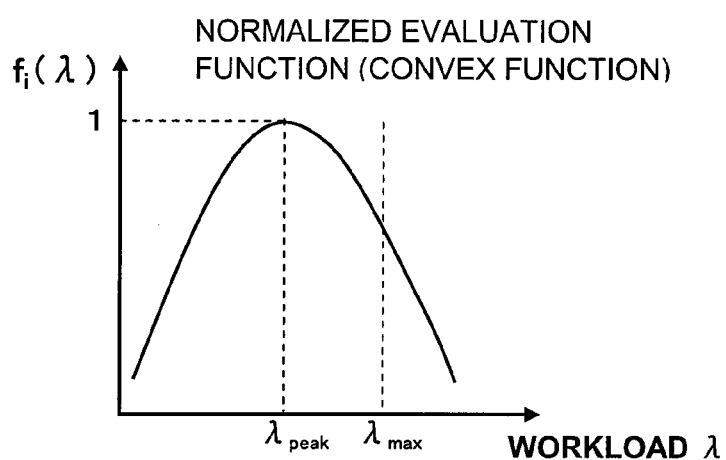
FIG. 6 is a graph showing an example of an evaluation function that is used in the invention of this application.

How the administrator is to implement the load balancing in a data center with the use of the invention of this application? The effective response and the throughput are in a trade-off relation as described above, which means that a rather light workload is to be distributed among components (resources) when response is valued more, whereas a heavy workload is to be distributed when throughput is valued more. Accordingly, functions set to the respective components are set by, for example, the following method:

FIG. 6 is a schematic diagram of evaluation functions. The axis of abscissa represents the workload because the subject studied here is load balancing. As described above, convex functions are preferred as evaluation functions, and a quadratic function that is convexed upward is used here. The symbol $\lambda_{max}$ represents a limit of the resource in question, and the symbol $\lambda_{peak}$ represents a peak point of the evaluation function. By normalization in which the peak of the evaluation function is set as 1, the normalized evaluation function is determined as a quadratic function that passes through (0, 0) and ($\lambda_{peak}$, 1). An evaluation function is obtained for each component (resource) by multiplying the normalized evaluation function by a coefficient $\alpha_i$, which is in proportion to a difference in performance between components. The point $\lambda_{peak}$ is where the throughput S is 1 and the effective response Re is 0. As described above, a rather light workload is distributed among the components (resources) when response is valued more, and a rather heavy workload is distributed when throughput is valued more. Accordingly, in the case where the system is to process work by putting importance on response, the point $\lambda_{peak}$ is set rather small whereas the point $\lambda_{peak}$ is set rather large when the system is to process work by putting importance on throughput. The system uses the method of this invention of this application to operate while solving the activation/shutdown problem and the optimization problem, and aims for a point as close to the point $\lambda_{peak}$ of each component as possible. Therefore, with the point $\lambda_{peak}$ set rather small, work is distributed among components bearing relatively light loads, and the overall system operates in a manner that values response more. With the point $\lambda_{peak}$ set rather large, work is distributed among components bearing relatively heavy loads, and the overall system operates in a manner that values throughput more. Resources being wasted are shut down as seen fit, and the resultant control is free from a waste of energy as well.

The axis of ordinate of the evaluation function in this case does not really represent some form of efficiency. The axis of ordinate rather indicates a point where the administrator wishes for the system to operate, and setting the evaluation function is not ruled by any physical quantity or principle. A person who wishes to run the system can set the axis of ordinate and the axis of abscissa at his/her own discretion. In a sense, once the system is given an instruction from a person in the form of an evaluation function, the system operates autonomously in a concerted manner from then on.

While the evaluation functions here are obtained by multiplying a quadratic function that passes through (0, 0) and ($\lambda_{peak}$, 1) by the coefficient $\alpha_1$, various other evaluation functions can be set as long as the evaluation functions are convex functions. In an extreme case, a hand-drawn evaluation function may be set.

An experiment of the load balancing in the data center which is illustrated in FIG. 1 has been conducted with the use of the evaluation functions described above. Each server has the function block of the invention of this application which is illustrated in FIG. 2 as a built-in component, and solves the activation/shutdown problem and the optimization problem while checking an evaluation function set to itself and the situation of another server connected to itself. Every server in this experiment is connected so that a difference between overall requests (demand) and the overall workload of the system at present which is necessary for demand-supply balancing can be monitored. In the case where connecting every server is a trouble, a part capable of monitoring a difference between demand and supply and informing each server of the difference may be set at the input.

Coefficients $K_1$, $K_2$, and the like for determining load balancing have been set suitably. The total count of servers is 1,000. The servers do not have homogeneous performance, and a larger a, has been set to a server having higher performance.

Figure 7A:
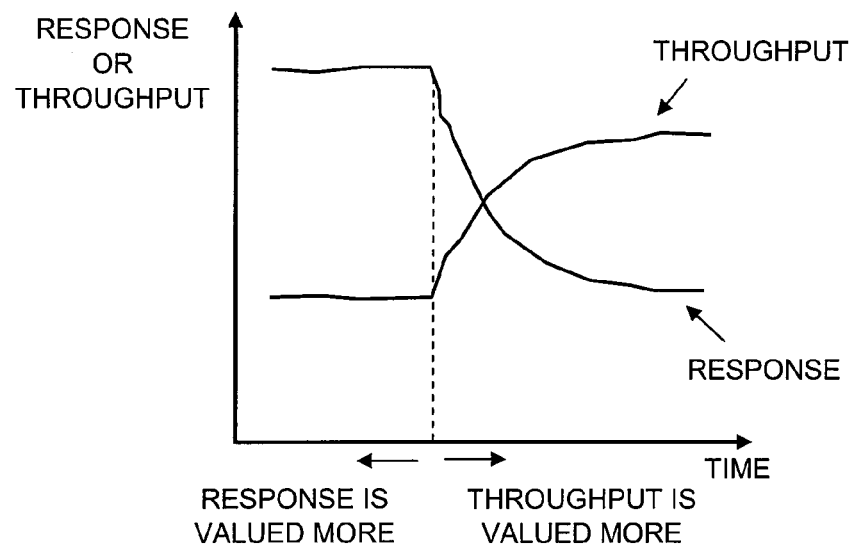
FIG. 7A is a graph showing an experiment result in an embodiment of the invention of this application.
Figure 7B:
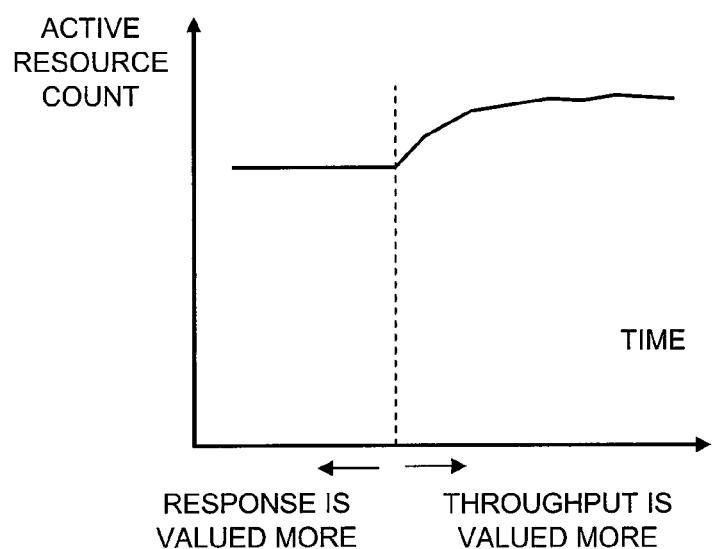
FIG. 7B is a graph showing an experiment result in the embodiment of the invention of this application.

FIGS. 7A and 7B show first experiment results. The axis of abscissa represents time in each of the graphs. The axis of ordinate in FIG. 7A represents the overall effective response/throughput of the system. The axis of ordinate in FIG. 7B represents the count of servers (resources) that are active. The system has at first been run in a manner that puts importance on response by setting $\lambda_{peak}$ rather small. Thereafter, $\lambda_{peak}$ has been reset so as to have a rather large value at a time point where "THROUGHPUT IS VALUED MORE" is written in the drawing. It has then been confirmed that the system has autonomously set about changing its operation toward a direction in which response is valued more. The active servers have been adjusted appropriately as well, and the effectiveness of the invention of this application has been confirmed.

Figure 8A:
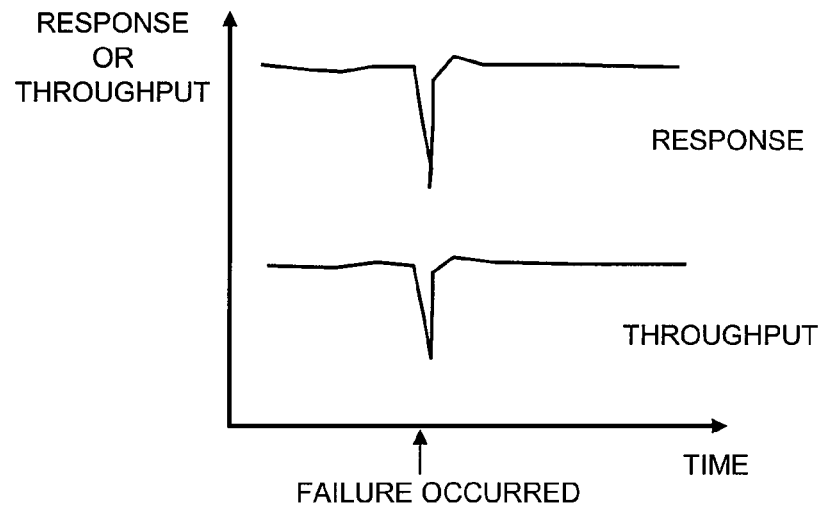
FIG. 8A is a graph showing an experiment result in the embodiment of the invention of this application.
Figure 8B:
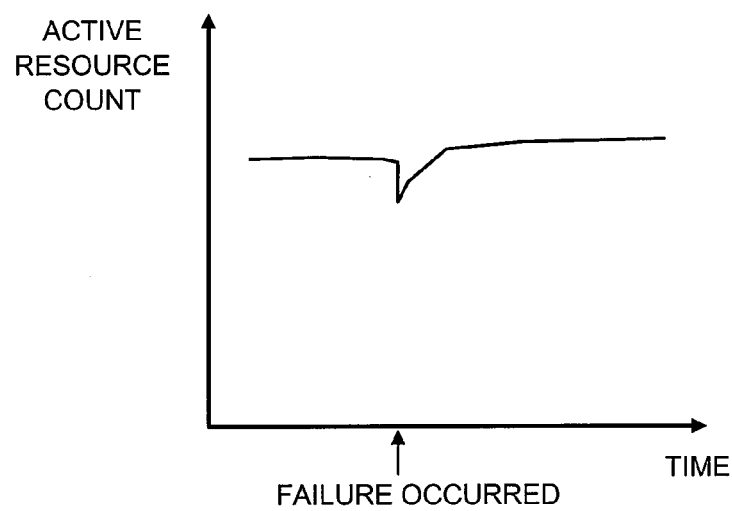
FIG. 8B is a graph showing an experiment result in the embodiment of the invention of this application.

FIGS. 8A and 8B show second experiment results. The axis of abscissa represents time in each of the graphs. The axis of ordinate in FIG. 8A represents the overall effective response/throughput of the system. The axis of ordinate in FIG. 8B represents the count of servers (resources) that are active. In the middle of running the system with $\lambda_{peak}$ set to a certain value, ten percent of the servers have been shut down artificially (portions of the drawings that are indicated by the arrows and where "FAILURE OCCURRED" is written). It can be seen that the throughput/response performance temporarily drops but recovers autonomously. Because the servers have heterogeneous performance instead of homogeneous performance, the count of servers that are in use after the autonomous recovery have changed from before the artificial shutting down of the servers. This indicates that the activation/shutdown problem has been solved truly autonomously. The effectiveness of the invention of this application concerning robustness against failures has been confirmed.

Figure 9A:
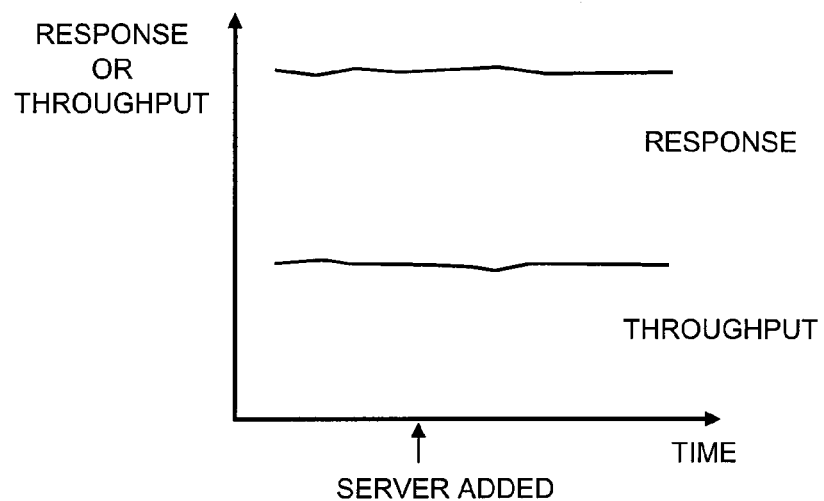
FIG. 9A is a graph showing an experiment result in the embodiment of the invention of this application.
Figure 9B:
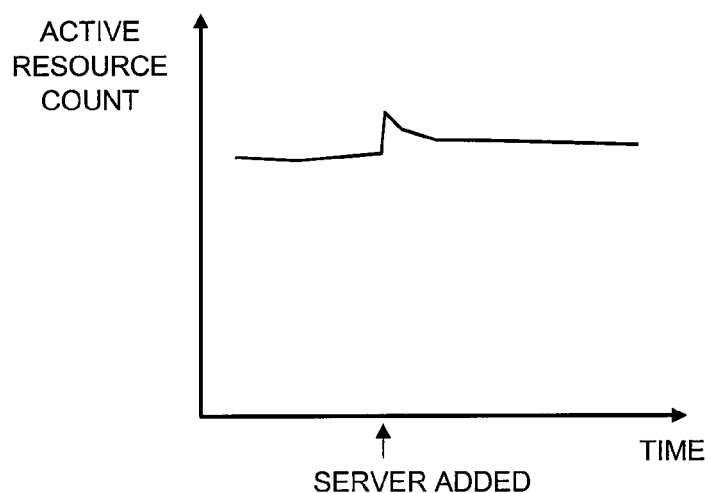
FIG. 9B is a graph showing an experiment result in the embodiment of the invention of this application.

FIGS. 9A and 9B show third experiment results. The axis of abscissa represents time in each of the graphs. The axis of ordinate in FIG. 9A represents the overall effective response/throughput of the system. The axis of ordinate in FIG. 9B represents the count of servers (resources) that are active. In the middle of running the system with $\lambda_{peak}$ set to a certain value, a hundred servers have been added artificially (portions of the drawings that are indicated by the arrows and where "SERVERS ADDED" is written). As a result, the system has autonomously activated/shut down the servers including the added servers, and have settled into a stable state without changes in throughput/response performance. This indicates that the system is scalable and means that there is no need to change programs or processing when resources are added or removed. This is a very useful characteristic and the effectiveness of the invention of this application has been confirmed.

Second Embodiment

The invention of this application is carried out for the load balancing among resources of the data center of FIG. 1 as in the first embodiment. The first embodiment is an embodiment of the invention of this application in which response and throughput are restraint conditions. Described here is an embodiment of the invention of this application in which energy is a restraint condition. Using energy as a restraint means that the system is to be run while saving as much electric power as possible.

This, too, is basically the matter of how to set an evaluation function.

By referring to a muscle efficiency expression, the energy efficiency of what operates can be expressed as the following Expression (13) with the use of idle power consumption $H_{def}$, working power consumption $W(\lambda)$, and additional working power consumption (such as power consumption of an air cooling fan) H.

$$f_i(\lambda) = \frac{W(\lambda)}{H_{def} + W(\lambda) + H} \quad (13)$$

Figure 10:
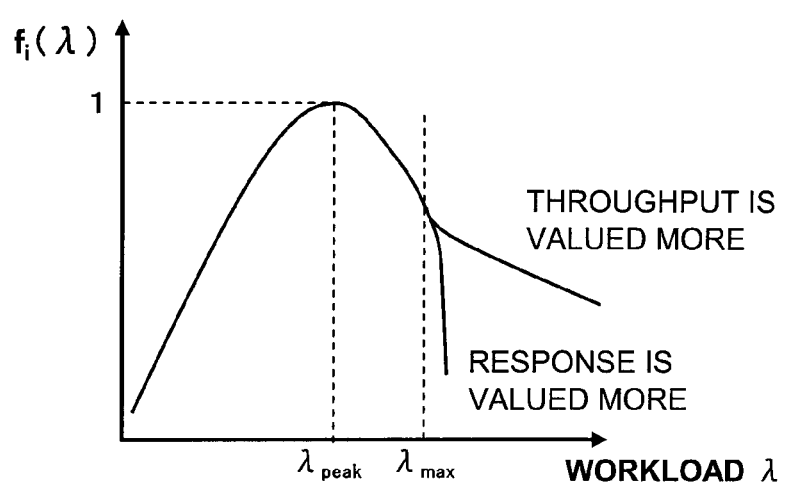
FIG. 10 is a graph showing an example of an evaluation function that is used in the invention of this application.

This efficiency is in general a convex function that peaks at some point where the workload is equal to or less than $\lambda_{max}$, and Expression (13) can therefore be used as an evaluation function in an area where the workload is equal to or less than $\lambda_{max}$. A workload more than $\lambda_{max}$ cannot be defined with this energy efficiency expression, and a graph thereof is therefore artificially drawn here. FIG. 10 shows an image of the evaluation function used. A portion of the evaluation function where the workload is more than $\lambda_{max}$ may be set at the administrator's discretion. For instance, in the case where response is valued more, the graph of that portion of the evaluation function is given a steep slope in order to reduce the workload quickly, and the gradient of that portion of the evaluation function is given a gentle curve in the case where throughput is valued more and there is thus no need to reduce the workload rapidly. The evaluation function can thus be created freely by the administrator. What needs to be paid attention to is that the freedom in creating the evaluation function sometimes makes it impossible to tell whether the value to be adapted by the evaluation function is adapted with objective quantitativeness. For instance, the evaluation function used here is an energy efficiency function which is quantitative in an area where the workload is equal to or less than $\lambda_{max}$, and is a qualitative function such as the degree of comfort of the administrator in an area where the workload is more than $\lambda_{max}$. In the case where objective quantitativeness is indispensable, it is necessary to consider using an objective index or something that can be converted into an objective index. However, many conventional systems are run based on the experience or preference of the administrator. The system that can be run with the use of a qualitative evaluation function can also be run to the preference of the administrator, and this is a beneficial characteristic rather than the opposite.

Figure 11A:
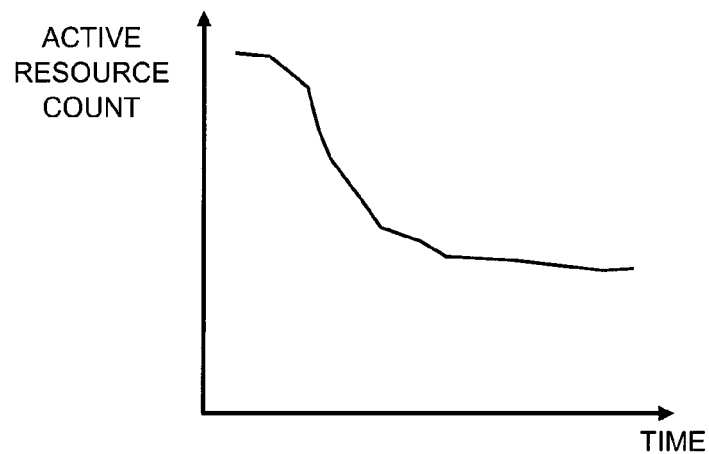
FIG. 11A is a graph showing an experiment result in an embodiment of the invention of this application.
Figure 11B:
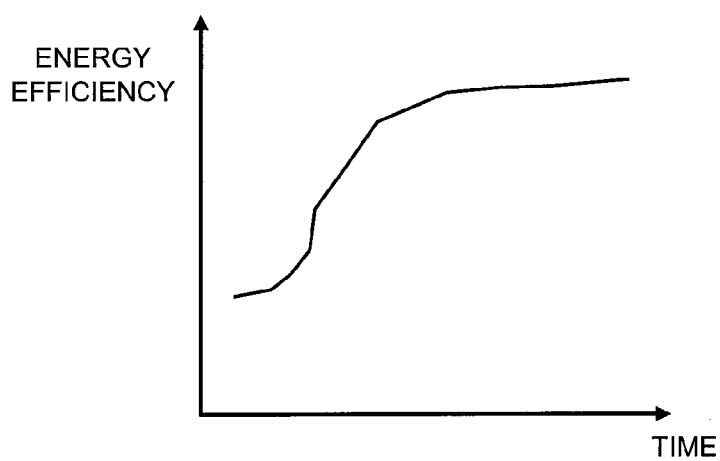
FIG. 11B is a graph showing an experiment result in the embodiment of the invention of this application.

An experiment of the load balancing in the data center has been conducted with the use of the evaluation function described above and the same configuration as the one in the first embodiment. FIGS. 11A and 11B show experiment results. In this example, all (a thousand) servers have been put into operation at first to see subsequent changes in energy efficiency and the count of operating servers. As can be seen in FIGS. 11A and 11B, there has been wasteful energy consumption at first due to all the servers operating simultaneously, but the system has successfully reduced energy consumption by autonomously selecting servers that are to be active and balancing the load. In short, the effectiveness of the invention of this application has been confirmed.

Third Embodiment

Figure 12:
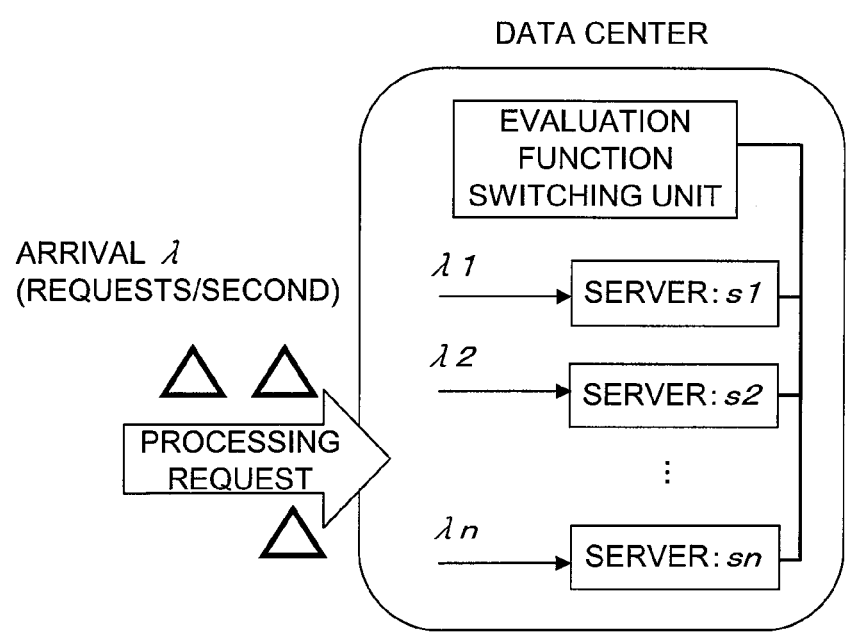
FIG. 12 is a schematic system diagram studied in the invention of this application.

Described in this embodiment is a method of switching between the control described in the first embodiment which puts importance on response or throughput and the control described in the second embodiment which puts importance on energy efficiency, depending on the situation. An experiment has been conducted with the use of a data center configuration that is basically the same as the one in the first embodiment. The only difference is that an evaluation function switching unit that issues a command for switching evaluation functions depending on the situation is provided in this embodiment. A schematic system diagram of this embodiment is illustrated in FIG. 12. The evaluation function switching unit transmits to each resource a command for switching the evaluation function to be referred to by each server (resource) to one of the evaluation function used in the first embodiment and the evaluation function used in the second embodiment. Receiving the command, each resource sets the evaluation function specified by the command and exerts control for solving the activation/shutdown problem and the optimization problem. The evaluation function switching unit may receive a wish of the administrator to select an evaluation function suitable for the wish and transmit a command to each resource. Alternatively, a classifier for determining the situation from some external input may be provided in order to automatically select an evaluation function with the use of the classifier. While the switching here is between two types, i.e., the evaluation function used in the first embodiment and the evaluation function used in the second embodiment, the count of evaluation function types between which a switch is made does not need to be limited to two, and a switch can be made between as many evaluation functions as desired by setting necessary evaluation functions. A single evaluation function switching unit is provided for the entire system in this example, but one evaluation function switching unit may instead be provided in each individual function block (resource).

Figure 13A:
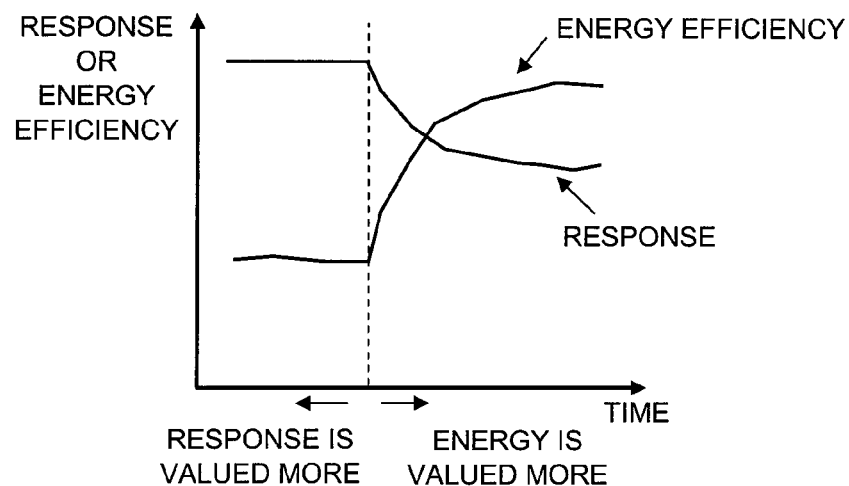
FIG. 13A is a graph showing an experiment result in an embodiment of the invention of this application.
Figure 13B:
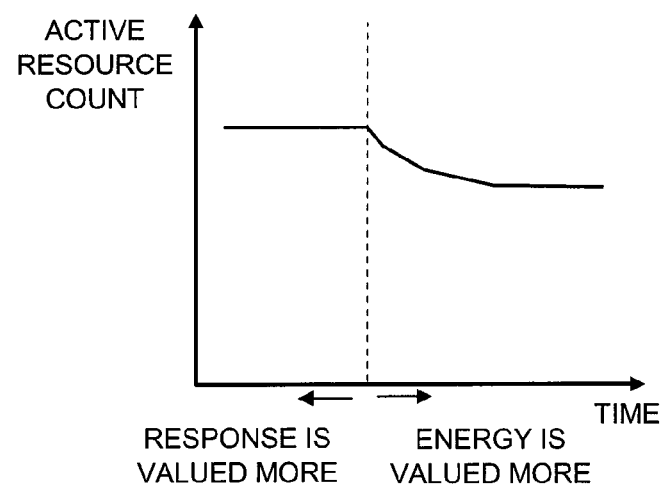
FIG. 13B is a graph showing an experiment result in the embodiment of the invention of this application.

Results of the experiment that uses the system described above are shown in FIGS. 13A and 13B. Conditions here are the same as those in the first and second embodiment, except that the evaluation function switching unit is provided. The axis of abscissa represents time in each of the graphs. The axis of ordinate in FIG. 13A represents the overall effective response/energy efficiency of the system. The axis of ordinate in FIG. 13B represents the count of servers (resources) that are active. The system has been run in a manner that puts importance on response at first, and switched in the middle (portions of the drawings that are indicated by the arrows, i.e., the time described by broken line) to control that puts importance on energy efficiency. The response in the beginning has taken a large value whereas the energy efficiency has not been so high. After the switch to the control that values energy efficiency more, the energy efficiency has improved whereas the response has dropped. In other words, it has been confirmed that the switching of evaluation functions via the evaluation function switching unit has succeeded. This embodiment also proves that, even when there are a plurality of requirements (putting importance on response, putting importance on energy, and the like), the administrator only needs to instruct a change of the operation objective of the system as seen fit to change the operation of the system, without changing programs or processing. In short, the invention of this application can operate effectively also when there are plurality of requirements, and the effectiveness of the invention of this application has been proved.

Fourth Embodiment

Figure 14:
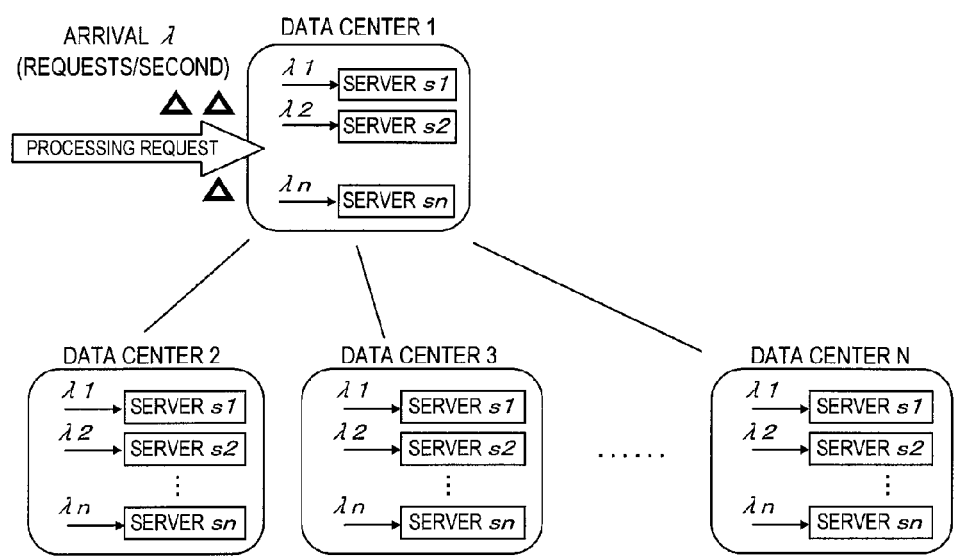
FIG. 14 is a schematic system diagram studied in the invention of this application.

Described in this embodiment is an example of load balancing among resources in which a plurality of data centers are connected by a network. The plurality of data centers, each of which has the same configuration as the one in the first embodiment, are coupled by the network to constitute a model illustrated in FIG. 14. A difference from the embodiments described above is that a delay due to the network cannot be ignored because resources are not closed off inside each data center. The difference means that, in the case of response/throughput, load balancing among function blocks (resources) needs to take into account the distance (delay) from a data center that issues processing requests (a data center that takes a main part in executing commanded processing).

Control exerted in this embodiment puts importance on response, specifically, uses the evaluation function of the first embodiment for all resources. The distance (delay) from the data center that issues processing requests is taken into account by multiplying a normalized evaluation function by a coefficient $$\frac{1}{1+Dly},$$

where Dly represents the amount of transmission delay from the data center that issues processing requests, in addition to multiplying by the performance coefficient $\alpha_i$ of components (resources) in each data center. The performance of a resource is thus recognized as relatively high by nearby data centers and as relatively low by distant data centers, with the result that the load is favorably balanced among resources over a network despite a delay caused by the network.

Figure 15A:
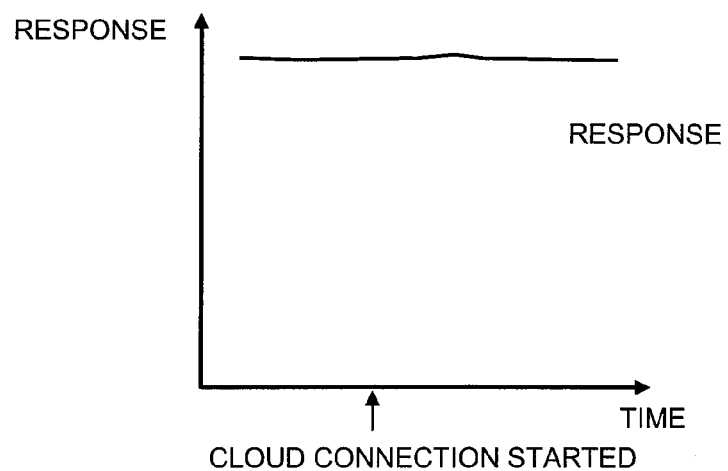
FIG. 15A is a graph showing an experiment result in an embodiment of the invention of this application.
Figure 15B:
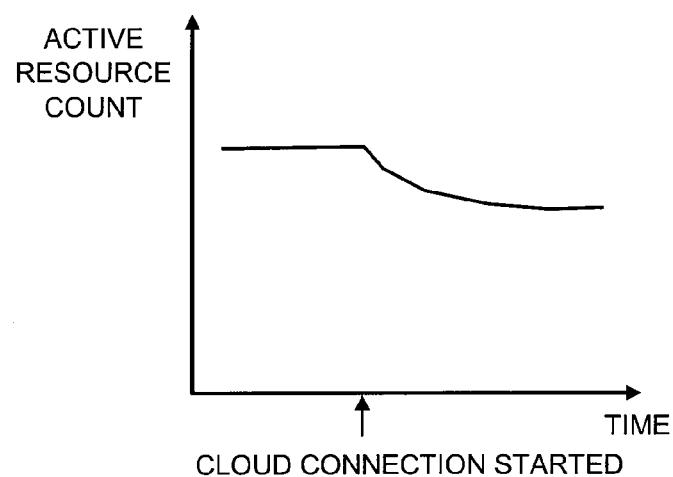
FIG. 15B is a graph showing an experiment result in the embodiment of the invention of this application.

FIGS. 15A and 15B show results of an experiment conducted for the model that includes the plurality of data centers described above. The axis of abscissa represents time in each of the graphs. The axis of ordinate in FIG. 15A represents the overall effective response of the system. The axis of ordinate in FIG. 15B represents the count of servers (resources) that are active. The experiment is about a case where many resources having distinctly superior processing performance are located near the data center that issues processing requests. This is the case where using resources of an external data center is expected to yield better results despite a delay due to the network. Processing is executed by a single data center (i.e., the data center that issues processing requests executes processing by itself) until a point indicated by the arrow in each of the drawings is reached. Past that point, the data center is coupled to the surrounding data centers in the manner of a network, and the response and the count of active servers have been observed. The active server count is the count of resources that are active in all data centers coupled by the network. It can be seen in FIGS. 15A and 15B that, when coupled to other data centers by the network, the data center autonomously activates/shuts down resources in search for resources that have distinctly superior processing performance, uses the resources having distinctly superior processing performance over the network while maintaining response performance, and autonomously reduces the count of active resources. The effectiveness of the invention of this application has been confirmed also for components (resources) that are coupled by a network having a delay. The use of the invention of this application will have a great significance in the future discussion about coordination between clouds.

Fifth Embodiment

The foregoing embodiments deal with balancing of the load among resources related to processing such as response, throughput, and energy. However, the invention of this application is applicable to other cases than this. Described here is an embodiment in which the invention of this application is used for storage load balancing.

Figure 16:
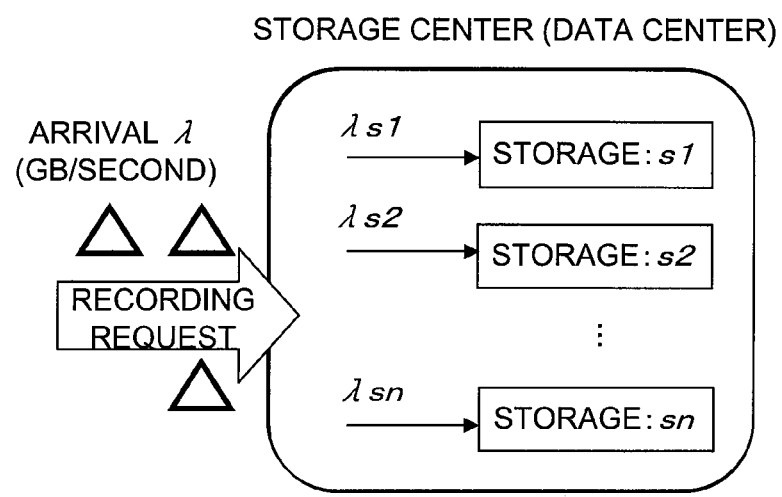
FIG. 16 is a schematic system diagram studied in the invention of this application.
Figure 17:
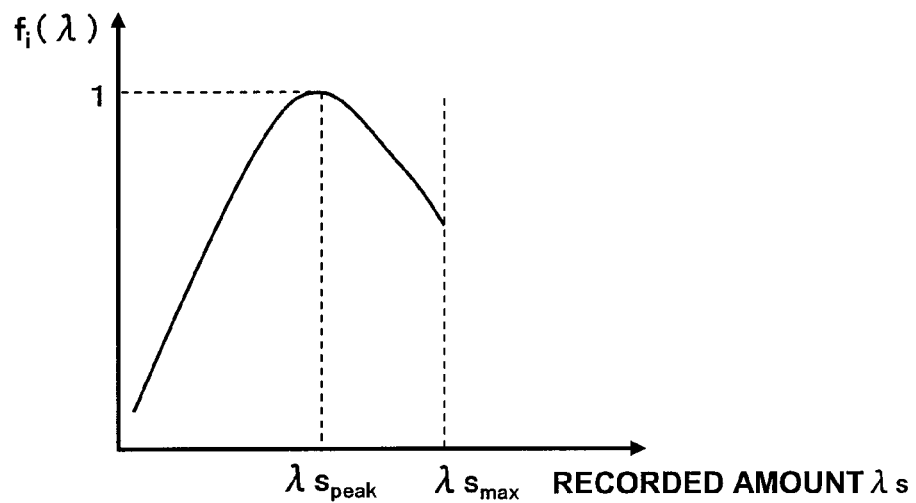
FIG. 17 is a graph showing an example of an evaluation function that is used in the invention of this application.

FIG. 16 is a schematic diagram of a system that is used in this embodiment, and presents an image in which resources of the first embodiment are replaced by storage. Each piece of storage has the function block of the invention of this application illustrated in FIG. 2 as a built-in component. In this case, too, how to set an evaluation function is an important point, and an evaluation function shown in FIG. 17 is used. In FIG. 17, the axis of abscissa represents a storage amount (recorded amount) $\lambda_S$. The axis of ordinate is normalized, and the normalized evaluation function is multiplied by a coefficient $\alpha s_i$ which is in proportion to the performance of storage. The performance in this case is determined by taking into account the recording speed, accessibility, archiving properties (keeping qualities), and the like. The system in this case may be controlled so that only the coefficient $\alpha s_i$ of each component is changed to suit the situation such as aiming to enhance the recording speed or aiming to improve archiving properties. By changing the coefficient, the system moves data to a piece of storage that is suitable for the request. The high degree of freedom in setting an evaluation function is one of the great advantages of the invention of this application.

Figure 18A:
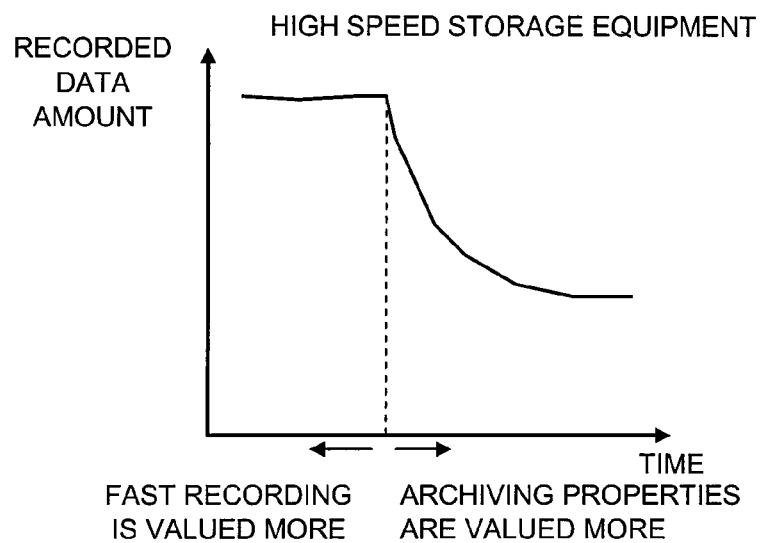
FIG. 18A is a graph showing an experiment result in an embodiment of the invention of this application.
Figure 18B:
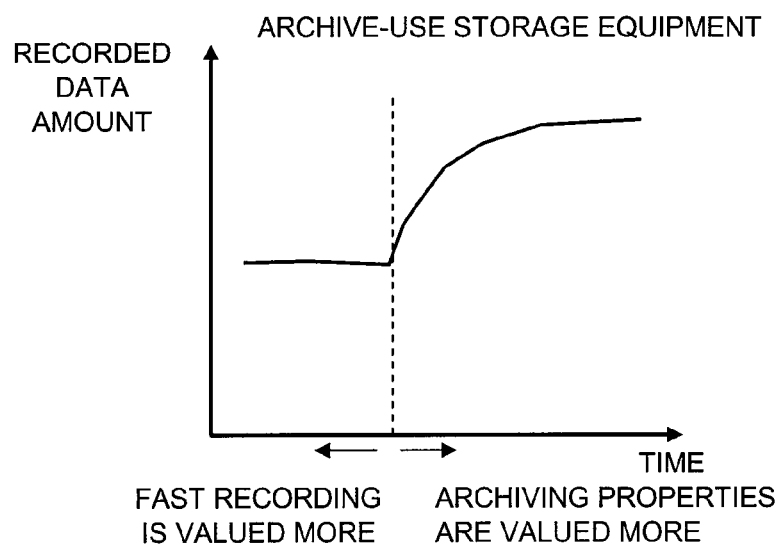
FIG. 18B is a graph showing an experiment result in the embodiment of the invention of this application.

FIGS. 18A and 18B show results of an experiment conducted about the example of storage load balancing described above. In each of the graphs, the axis of abscissa represents time and the axis of ordinate represents the amount of data recorded in a piece of storage in question. This example shows results of monitoring one of pieces of storage that are high in recording speed and one of pieces of storage that are high in archiving properties. A switch has been made from an evaluation function for valuing high recording speed more to an evaluation function for valuing archiving properties more at a point indicated by the arrows in each of the drawings (i.e., the time described by broken line). As can be seen in the drawings, the capacity of the storage that is high in archiving properties has increased past the arrows (i.e., the time described by broken line) whereas the recorded amount of the storage that is high in recording speed has decreased. In short, the system has autonomously realized the intent of the administrator. The invention of this application can thus be used in a similar manner in various fields where some kind of function blocks (resources) exist in relation to one another (are coupled by a network). This has been confirmed in the fifth embodiment.

Sixth Embodiment

The foregoing embodiments discuss load balancing control in the information field. However, the application of the invention of this application is not limited to the information field. For instance, this invention can be used in the control of infrastructure such as energy or water with no problems. Described in this embodiment is an example of connecting a plurality of solar energy sources with the use of the invention of this application to see whether adequate electric power is obtained.

Figure 19:
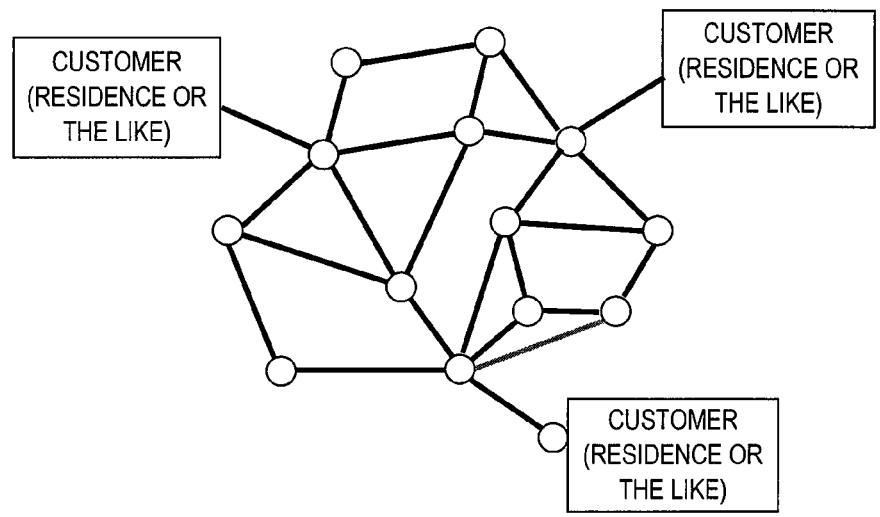
FIG. 19 is a schematic system diagram studied in the invention of this application.

A schematic diagram of this embodiment is illustrated in FIG. 19. A circular mark represents a solar energy source. Customers consume energy and some customers also act as suppliers of solar energy. Such customers are marked with the circular mark. Each solar energy generation source has the function block of the invention of this application illustrated in FIG. 2 as a built-in component. Each solar energy generation source solves the activation/shutdown problem and the optimization problem while checking an evaluation function set to itself and the situations of other solar energy generation sources connected to itself. Changing a panel angle is employed here as a method of adjusting the electric power of a solar energy generation source by itself. This embodiment is an example of an experiment that uses a model form of so-called smart grid. Although the inventors of this invention have not succeeded in conducting an experiment that uses an electric power grid provided by an electric power company for reasons concerning the experiment, this invention surely works effectively for a heterogeneous (hybrid) electric power grid, which includes a power house of an electric company and renewable energy (solar energy, wind power energy, and the like) in the case where this embodiment has been proven effective.

Figure 20A:
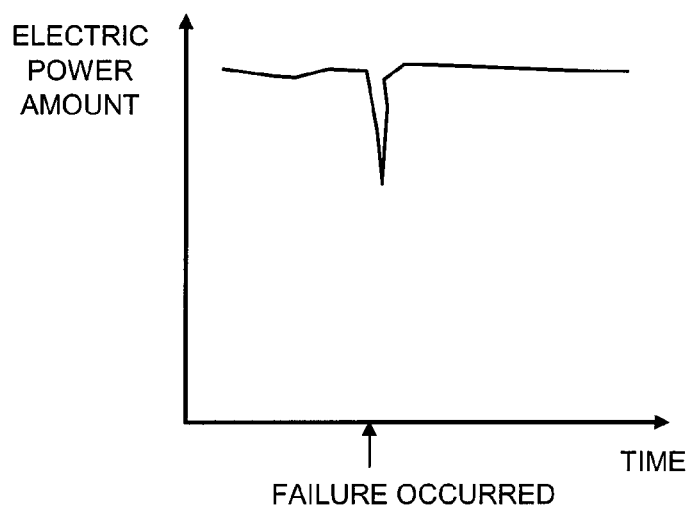
FIG. 20A is a graph showing an experiment result in an embodiment of the invention of this application.
Figure 20B:
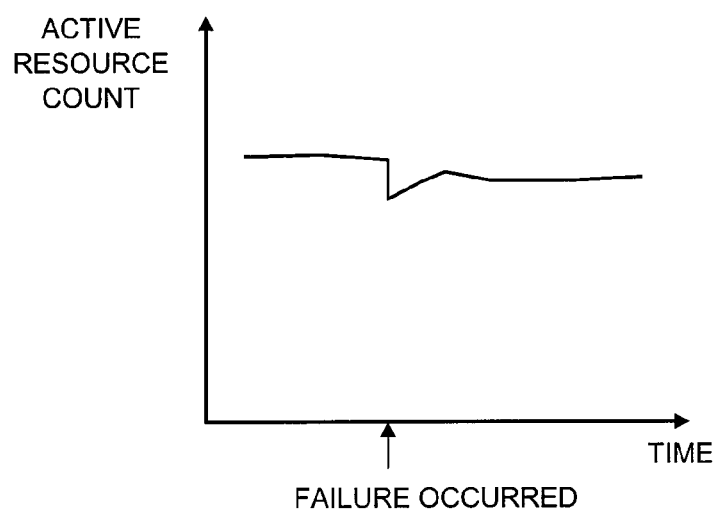
FIG. 20B is a graph showing an experiment result in the embodiment of the invention of this application.

FIGS. 20A and 20B show results of an experiment conducted about the example of load balancing of electric power described above. The axis of abscissa represents time in each of the graphs. The axis of ordinate in FIG. 20A represents the overall electric power amount of the system. The axis of ordinate in FIG. 20B represents the count of solar energy sources (resources) that are in operation. Some of the solar energy sources have been cut off intentionally at a point indicated by the arrow in each of the drawings where "FAILURE OCCURRED" is written. At the time some of the solar energy sources have been cut off, the electric power amount has dropped for an instant, but soon returned to an adequate level autonomously. Renewable energy is expected to increasingly infiltrate into existing electric power grids in the future. As an energy source greatly affected by situations, renewable energy succeeds in and fails at supplying electric power on a daily basis, and when electric power is successfully supplied from a renewable energy source cannot be predicted. Under such a situation, a system needs to be capable of autonomous self-recovery as in the embodiment of the invention of this application. The invention of this application is therefore expected to be of great use. This embodiment has proven that the invention of this application is effective for control not only in the information field but also in the infrastructure field.

Seventh Embodiment

The previous embodiments are configured so that the evaluation function is set in advance, or supplied, by an administrator. In other words, the evaluation function used is rather fixed. Some of the embodiments also do not guarantee a complete quantitative match with an actual efficiency or the like. Described here is a method of gradually and quantitatively bringing the evaluation function close to the actual one. The described method is for gradually changing an evaluation function about energy efficiency, which is an actually measurable amount, in line with reality. This embodiment is about energy efficiency and therefore has the same basic configuration as that of the second embodiment.

Figure 21A:
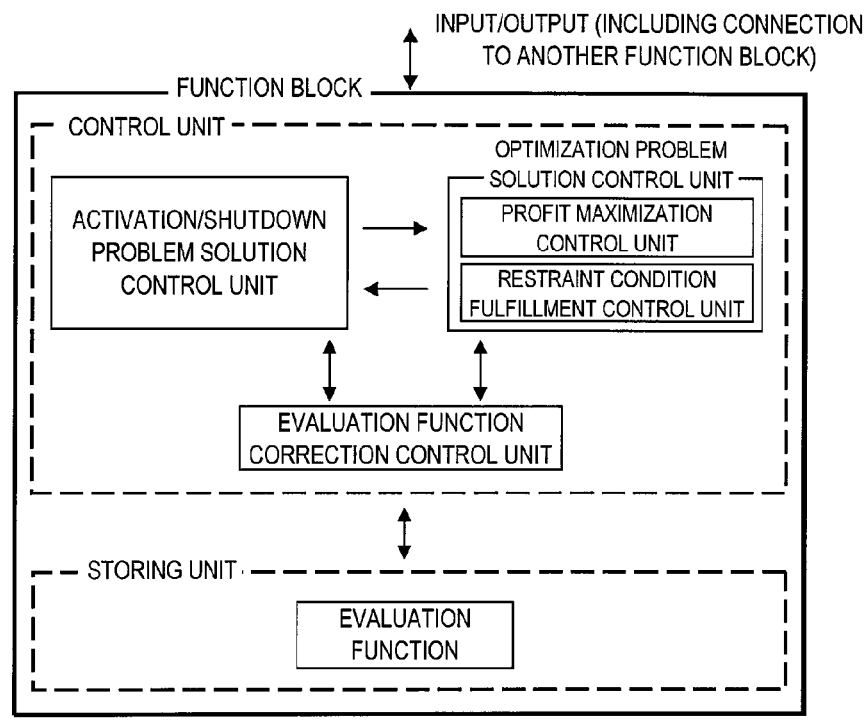
FIG. 21A is a schematic system diagram studied in the invention of this application.
Figure 21B:
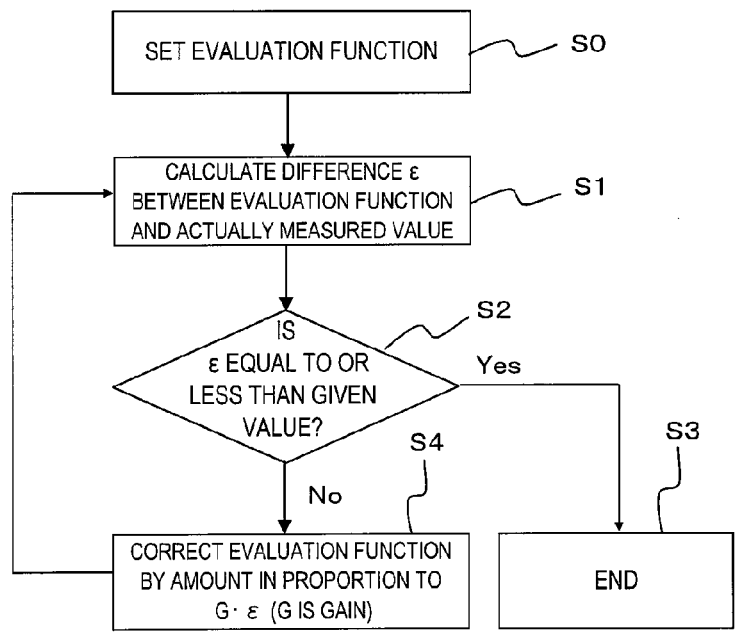
FIG. 21B is a schematic system diagram studied in the invention of this application.

This embodiment is for gradually and quantitatively turning an evaluation function set to each resource into an accurate one. The method basically involves feeding back a value that is obtained by multiplying, by a coefficient, a difference between a first-set value of the evaluation function and a current, actually measured value. The evaluation function thus gradually takes a quantitatively correct value. This feedback process is executed by an evaluation function correction control unit, which is provided in each function block (resource) as illustrated in FIG. 21A to execute processes denoted by S0 to S4 in FIG. 21B.

Figure 22:
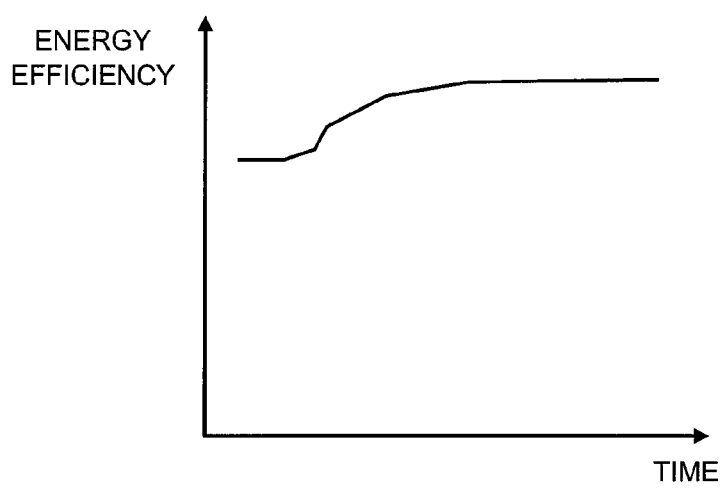
FIG. 22 is a graph showing an experiment result in an embodiment of the invention of this application.

How energy efficiency shifts in the system described above is shown in FIG. 22. Conditions here are the same as in the second embodiment, except that the evaluation function correction control unit is provided to each resource. The axis of abscissa represents time and the axis of ordinate represents energy efficiency in the graph. The graph shows that energy efficiency has improved with time. It has been proven that this invention allows a dynamic adjustment of an evaluation function as well.

Eighth Embodiment

Figure 23A:
FIG. 23A is a schematic system diagram studied in the invention of this application.
Figure 23B:
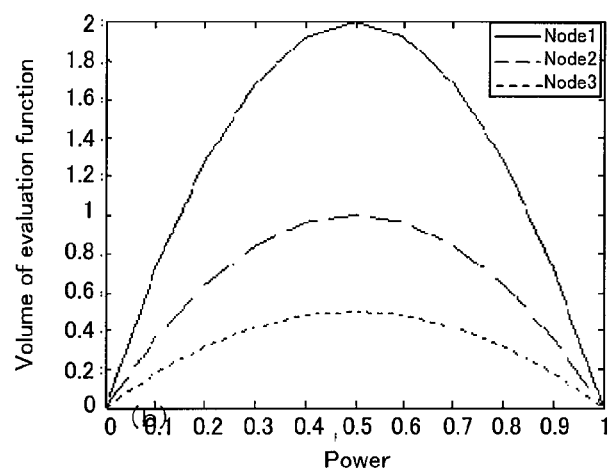
FIG. 23B is a schematic system diagram studied in the invention of this application.
Figure 24A:
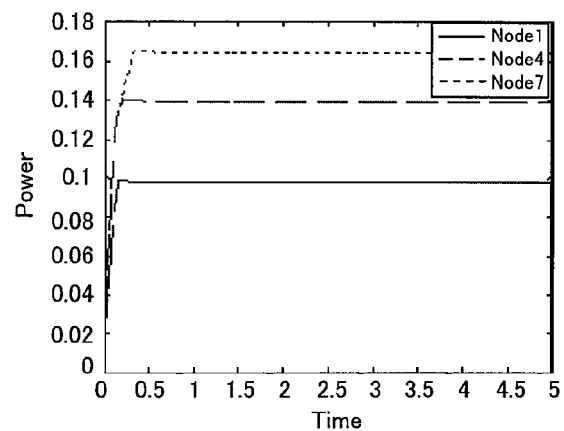
FIG. 24A is a graph showing an experiment result in an embodiment of the invention of this application.
Figure 24B:
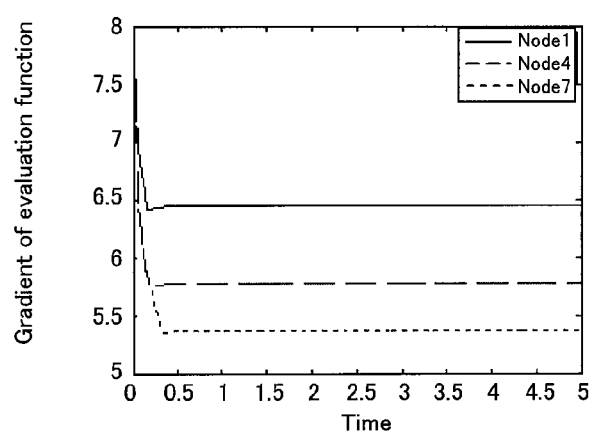
FIG. 24B is a graph showing an experiment result in the embodiment of the invention of this application.

The previous embodiments do not include a description about cases where a shut down component (node) cuts off the network completely. Such cases are few and, because no problem arises if there is a part that manages all nodes, do not necessarily need to be considered. This embodiment gives consideration to such cases anyway. Examined here is, for the sake of simplification, load balancing among nine nodes (function blocks) that are aligned in a straight line as illustrated in FIG. 23A. This embodiment can also be regarded as having the particular network shape of FIG. 1. Each node number is divided by 3 so that, as illustrated in FIG. 23B, the same evaluation function is used for nodes that have 1 as the remainder of the division, while nodes that have 2 as the remainder share the same evaluation function and nodes that have 0 as the remainder share the same evaluation function. Results of simply applying the invention of this application with the total demand set to 0.4 are shown in FIGS. 24A and 24B. In theory, nodes 1, 4, and 7 should have the same load while the load of the other nodes is 0, but the results tell that the nodes 1, 4, and 7 do not have the same load (though not shown in the graphs, the load of the other nodes has been confirmed to be 0). The nodes 1, 4, and 7 also do not have the same differential value of the evaluation function. In short, the activation/shutdown problem and the optimization problem have not been solved well. This is because the intervening nodes that connect the nodes 1, 4, and 7 have been shut down and the second term of the right-hand side of Expression (9) has consequently stopped working.

This problem can be solved by exerting control so that the shut down nodes transmit the differential values of the evaluation functions of adjacent nodes that are active to surrounding nodes. Specifically, each activation/shutdown problem solving block is incorporated with a function of transmitting the differential values of the evaluation functions of the surrounding active nodes to neighbor nodes even when its own node is shut down.

Figure 25A:
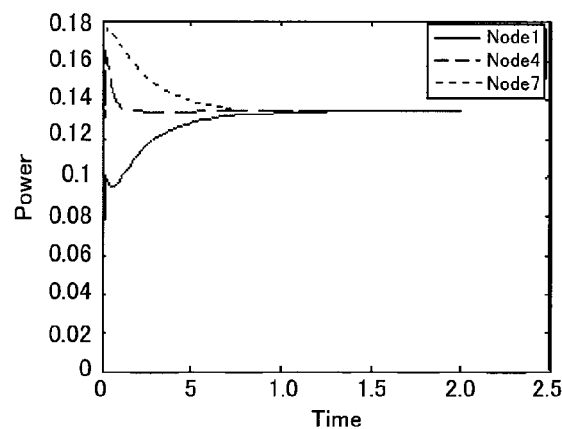
FIG. 25A is a graph showing an experiment result in the embodiment of the invention of this application.
Figure 25B:
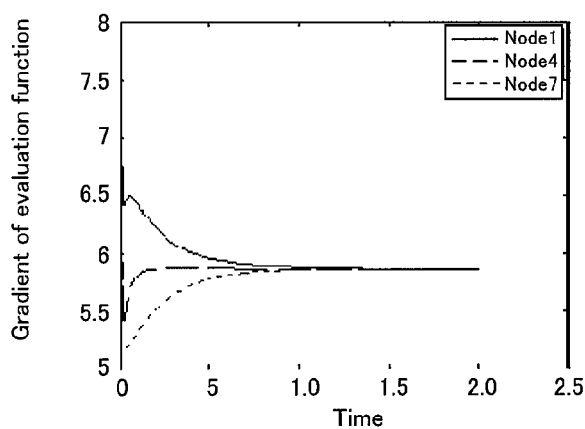
FIG. 25B is a graph showing an experiment result in the embodiment of the invention of this application.

Results of exerting this control are shown in FIGS. 25A and 25B. The graphs show that, despite the intervening nodes having been shut down, the nodes 1, 4, and 7 have properly interacted with one another to solve the activation/shutdown problem and the optimization problem. By thus giving each activation/shutdown problem solving block the function of managing the situation of its own node and the surrounding nodes, the activation/shutdown problem and the optimization problem can be solved without a trouble under various situations.

Using this method solves the activation/shutdown problem and the optimization problem without a trouble even in the case where there is a critical path due to the design of the system and a failure occurs in the path.

INDUSTRIAL APPLICABILITY

This invention can contribute to general control of a system that includes a plurality of function blocks and runs the plurality of function blocks by integrating the function blocks in a manner adaptive to autonomous decentralization, and has tremendous industrial applicability. This invention accomplishes, easily and scalably, control for making the system robust against external disturbance and for adapting the system in real time in a manner that depends on the situation.

The embodiment mode and embodiments described above give a description on the invention of this application by using examples of load balancing in a data center, storage load balancing, control of solar power generators, and the like. However, the invention of this application is not limited to the information field and the infrastructure field as already described, and can be used in a similar manner in various fields where some kind of function blocks (resources) exist in relation to one another (are coupled by a network).

Each unit in the function blocks can be implemented by a combination of hardware and software. The units in the form of a combination of hardware and software operate as various means by deploying a program of a system of this invention onto a RAM and running hardware such as a control unit (CPU) based on the program. The program may be recorded on a storage medium to be distributed. The program recorded on the recording medium is read onto a memory via a cable, radio, or the recording medium itself, and runs the control unit and others. Examples of the recording medium include an optical disc, a magnetic disk, a semiconductor memory device, and a hard disk.

The invention claimed is:

1. A system, comprising a plurality of function blocks correlated to one another,
   wherein each of the plurality of function blocks is implemented by a combination of hardware and software and comprises:
      a storing unit comprising an evaluation function that is associated with the each of the plurality of function blocks;
      a restraint condition fulfillment control unit for controlling an operation level of the each of the plurality of function blocks based on a restraint condition that is to be fulfilled by the each of the plurality of function blocks and all of the plurality of function blocks together;
      a profit maximization control unit for controlling the operation level of the each of the plurality of function blocks by information about the evaluation function of another of the plurality of function blocks that has a relation with the each of the plurality of function blocks; and
      an activation/shutdown problem solution control unit for controlling an active state/shutdown state of the each of the plurality of function blocks depending on the operation level of the each of the plurality of function blocks, by using results of the control of the restraint condition fulfillment control unit and the control of the profit maximization control unit, and
   wherein the restraint condition fulfillment control unit determines the operation level of the each of the plurality of function blocks by using an equation in which a relation satisfying the following expression is established:

$$\frac{d\lambda_i}{dt} \propto Dem - \sum_k \lambda_k,$$

-continued where $$Dem = \sum_i \lambda_i;$$

t denotes time;
$\lambda_i$ denotes the operation level of an i-th function block; and
$\lambda_k$ denotes the operation level of a function block related to the i-th function block.

2. A system according to claim 1, wherein the restraint condition fulfillment control unit determines the operation level of the each of the plurality of function blocks by using an equation in which a relation satisfying the following expression is established:

$$\frac{d\lambda_i}{dt} = K_1 \cdot \lambda_{nom,i} \frac{Dem - \sum_k \lambda_k}{Dem}.$$

where $\lambda_i$ denotes the operation level of the i-th function block;
$\lambda_k$ denotes the operation level of the function block related to the i-th function block;
$K_1$ denotes a coefficient equivalent to a gain of a change in operation level; and
$\lambda_{nom,i}$ denotes a normalization coefficient of the i-th function block.

3. A system, comprising a plurality of function blocks correlated to one another,
wherein each of the plurality of function blocks is implemented by a combination of hardware and software and comprises:
a storing unit comprising an evaluation function that is associated with the each of the plurality of function blocks;
a restraint condition fulfillment control unit for controlling an operation level of the each of the plurality of function blocks based on a restraint condition that is to be fulfilled by the each of the plurality of function blocks and all of the plurality of function blocks together;
a profit maximization control unit for controlling the operation level of the each of the plurality of function blocks by information about the evaluation function of another of the plurality of function blocks that has a relation with the each of the plurality of function blocks; and
an activation/shutdown problem solution control unit for controlling an active state/shutdown state of the each of the plurality of function blocks depending on the operation level of the each of the plurality of function blocks, by using results of the control of the restraint condition fulfillment control unit and the control of the profit maximization control unit,
wherein the profit maximization control unit determines the operation level of the each of the plurality of function blocks by using an equation in which a relation satisfying the following expression is established:

$$\frac{d\lambda_i}{dt} \propto \left(\frac{df_i}{d\lambda_i} - \frac{df_k}{d\lambda_k}\right),$$

where $f_i$ denotes an evaluation function of an i-th function block; and
$f_k$ denotes an evaluation function of another function block that has a relation with the i-th function block.

4. A system according to claim 3, wherein the profit maximization control unit determines the operation level of the each of the plurality of function blocks by using an equation in which a relation satisfying the following expression is established:

$$\frac{d\lambda_i}{dt} = K_2 \cdot \lambda_{nom,i} \frac{\sum_k \lambda_{nom,k}\left(\frac{df_i}{d\lambda_i} - \frac{df_k}{d\lambda_k}\right)}{\sum_k \lambda_{nom,k}},$$

where $K_2$ denotes a coefficient equivalent to a gain of a change in operation level.

5. A system according to claim 4, wherein the activation/shutdown problem solution control unit controls the active state/shutdown state of the each of the plurality of function blocks by using the following expression:

$$\frac{d\lambda_i}{dt} = K_1 \cdot \lambda_{nom,i} \frac{Dem - \sum_k \lambda_k}{Dem} + K_2 \cdot \lambda_{nom,i} \frac{\sum_k \lambda_{nom,k}\left(\frac{df_i}{d\lambda_i} - \frac{df_k}{d\lambda_k}\right)}{\sum_k \lambda_{nom,k}}.$$

6. A system according to claim 5, wherein, when another of the plurality of function blocks that has a relation with the each of the plurality of function blocks has the operation level that is a lower limit or an upper limit, the activation/shutdown problem solution control unit treats the another of the plurality of function blocks as non-existent in a calculation of a second term of a right-hand side of the following expression:

$$\frac{d\lambda_i}{dt} = K_1 \cdot \lambda_{nom,i} \frac{Dem - \sum_k \lambda_k}{Dem} + K_2 \cdot \lambda_{nom,i} \frac{\sum_k \lambda_{nom,k}\left(\frac{df_i}{d\lambda_i} - \frac{df_k}{d\lambda_k}\right)}{\sum_k \lambda_{nom,k}}.$$

7. A system according to claim 5, wherein, when the each of the plurality of function blocks has the operation level that is a lower limit or an upper limit, the activation/shutdown problem solution control unit calculates the following expression with a second term of a right-hand side of the following expression treated as non-existent:

$$\frac{d\lambda_i}{dt} = K_1 \cdot \lambda_{nom,i} \frac{Dem - \sum_k \lambda_k}{Dem} + K_2 \cdot \lambda_{nom,i} \frac{\sum_k \lambda_{nom,k}\left(\frac{df_i}{d\lambda_i} - \frac{df_k}{d\lambda_k}\right)}{\sum_k \lambda_{nom,k}}.$$

8. A system, comprising a plurality of function blocks correlated to one another,
wherein each of the plurality of function blocks is implemented by a combination of hardware and software and comprises:
a storing unit comprising an evaluation function that is associated with the each of the plurality of function blocks;

a restraint condition fulfillment control unit for controlling an operation level of the each of the plurality of function blocks based on a restraint condition that is to be fulfilled by the each of the plurality of function blocks and all of the plurality of function blocks together;

a profit maximization control unit for controlling the operation level of the each of the plurality of function blocks by information about the evaluation function of another of the plurality of function blocks that has a relation with the each of the plurality of function blocks; and an activation/shutdown problem solution control unit for controlling an active state/shutdown state of the each of the plurality of function blocks depending on the operation level of the each of the plurality of function blocks, by using results of the control of the restraint condition fulfillment control unit and the control of the profit maximization control unit, wherein the restraint condition fulfillment control unit and the activation/shutdown problem solution control unit determine the operation level of the each of the plurality of function blocks by using an equation in which a relation satisfying the following expression is established:

$$\frac{d\lambda_i}{dt} = K_1 \cdot \lambda_{nom,i} \frac{Dem - \sum_k \lambda_k}{Dem} + K_2 \cdot \lambda_{nom,i} \frac{\sum_k \lambda_{nom,k}\left(\frac{df_i}{d\lambda_i} - \frac{df_k}{d\lambda_k}\right)}{\sum_k \lambda_{nom,k}}.$$

9. A system, comprising a plurality of function blocks correlated to one another, wherein each of the plurality of function blocks is implemented by a combination of hardware and software and comprises:

a storing unit comprising an evaluation function that is associated with the each of the plurality of function blocks;

a restraint condition fulfillment control unit for controlling an operation level of the each of the plurality of function blocks based on a restraint condition that is to be fulfilled by the each of the plurality of function blocks and all of the plurality of function blocks together;

a profit maximization control unit for controlling the operation level of the each of the plurality of function blocks by information about the evaluation function of another of the plurality of function blocks that has a relation with the each of the plurality of function blocks; and an activation/shutdown problem solution control unit for controlling an active state/shutdown state of the each of the plurality of function blocks depending on the operation level of the each of the plurality of function blocks, by using results of the control of the restraint condition fulfillment control unit and the control of the profit maximization control unit, wherein, when the each of the plurality of function blocks has the operation level that is a lower limit or an upper limit, the activation/shutdown problem solution control unit transmits information about the evaluation functions of adjacent function blocks, to thereby adjust profit maximization control of function blocks that are active among the plurality of function blocks.

10. A system according to any one of claims 1, 3, 8 and 9, wherein the evaluation function comprises a convex function.

11. A system according to any one of claims 1, 3, 8 and 9, wherein, when one of the plurality of function blocks has the operation level that is a lower limit or an upper limit, the activation/shutdown problem solution control unit controls the active state/shutdown state of the each of the plurality of function blocks by adjusting results of the control of the profit maximization control unit.

12. A system according to claim 11, wherein, when another of the plurality of function blocks that has a relation with the each of the plurality of function blocks has the operation level that is a lower limit or an upper limit, the activation/shutdown problem solution control unit controls the active state/shutdown state of the each of the plurality of function blocks by using results of operation level control that is exerted by the profit maximization control unit with the another of the plurality of function blocks treated as non-existent.

13. A system according to claim 11, wherein, when the each of the plurality of function blocks has the operation level that is a lower limit or an upper limit, the activation/shutdown problem solution control unit controls the active state/shutdown state of the each of the plurality of function blocks without using the results of the control of the profit maximization control unit.

14. A system according to any one of claims 1, 3, 8 and 9, wherein the information from the another of the plurality of function blocks that has a relation with the each of the plurality of function blocks comprises information about a value in proportion to a gradient of the evaluation function of the another of the plurality of function blocks, and comprises information for suppressing an operation of the each of the plurality of function blocks.

15. A system control method for use in the system according to any one of claims 1, 3, 8 and 9.

16. A function block, which is to be connected to and correlated to a plurality of other function blocks, the function block being implemented by a combination of hardware and software and comprising:

a storing unit comprising an evaluation function;

a restraint condition fulfillment control unit for controlling an operation level based on a restraint condition that is to be fulfilled by the function block and all of the plurality of other function blocks together;

a profit maximization control unit for controlling the operation level by information about evaluation functions of the plurality of other function blocks; and an activation/shutdown problem solution control unit for controlling an active state/shutdown state depending on the operation level, by using results of the control of the restraint condition fulfillment control unit and the control of the profit maximization control unit, wherein the restraint condition fulfillment control unit determines the operation level of the each of the plurality of function blocks by using an equation in which a relation satisfying the following expression (1) is established:

$$\frac{d\lambda_i}{dt} \propto Dem - \sum_k \lambda_k,$$

where

-continued $$Dem = \sum_i \lambda_i;$$

t denotes time;

$\lambda_i$ denotes the operation level of an i-th function block; and $\lambda_k$ denotes the operation level of a function block related to the i-th function block.

17. A function block according to claim 16, wherein the evaluation function comprises a convex function.

18. A function block according to claim 16 or 17, wherein, when one of the plurality of other function blocks has the operation level that is a lower limit or an upper limit, the activation/shutdown problem solution control unit controls the active state/shutdown state of the function block by using results of operation level control that is exerted by the profit maximization control unit with the one of the plurality of other function blocks treated as non-existent.

19. A function block according to claim 16 or 17, wherein, when one of the plurality of other function blocks has the operation level that is a lower limit or an upper limit, the activation/shutdown problem solution control unit controls the active state/shutdown state of the function block without using the results of the control of the profit maximization control unit.

* * * * *

UNITED STATES PATENT AND TRADEMARK OFFICE
CERTIFICATE OF CORRECTION

PATENT NO. : 9,626,635 B2
APPLICATION NO. : 14/118718
DATED : April 18, 2017
INVENTOR(S) : Masatsugu Ogawa et al.

It is certified that error appears in the above-identified patent and that said Letters Patent is hereby corrected as shown below:

In the Specification

Column 3, Line 15:
"Ti" has been replaced with --$\eta$--

Column 8, Line 23:
Before "represents", insert --$\lambda_k$--

Column 8, Line 55:
"X" has been replaced with --$\lambda$--

Column 13, Line 12:
"k." has been replaced with --$\lambda$.--

Column 14, Line 66:
"a," has been replaced with --$\alpha_i$--

Signed and Sealed this
Twentieth Day of February, 2018

Andrei Iancu
*Director of the United States Patent and Trademark Office*